(12) United States Patent
Bonefas

(10) Patent No.: US 8,868,304 B2
(45) Date of Patent: Oct. 21, 2014

(54) METHOD AND STEREO VISION SYSTEM FOR FACILITATING THE UNLOADING OF AGRICULTURAL MATERIAL FROM A VEHICLE

(71) Applicant: Deere & Company, Moline, IL (US)

(72) Inventor: Zachary T. Bonefas, Urbandale, IA (US)

(73) Assignee: Deere & Company, Moline, IL (US)

( * ) Notice: Subject to any disclaimer, the term of this patent is extended or adjusted under 35 U.S.C. 154(b) by 113 days.

(21) Appl. No.: 13/762,508

(22) Filed: Feb. 8, 2013

(65) Prior Publication Data

US 2013/0211658 A1 Aug. 15, 2013

Related U.S. Application Data

(60) Provisional application No. 61/597,374, filed on Feb. 10, 2012.

(51) Int. Cl.
*B65G 67/24* (2006.01)
*A01D 41/12* (2006.01)
*A01D 43/08* (2006.01)

(52) U.S. Cl.
CPC ............ *B65G 67/24* (2013.01); *A01D 41/1217* (2013.01); *A01D 43/087* (2013.01)
USPC ................. 701/50; 701/28; 701/41; 701/117; 701/300; 701/408; 701/534

(58) Field of Classification Search
CPC .... G06F 7/00; A01D 41/1217; A01D 43/086; A01D 43/087; A01B 69/008; A01B 69/007; A01B 79/005; G05D 1/0287

USPC .......... 701/50, 117, 408, 534, 300, 28, 41, 49
See application file for complete search history.

(56) References Cited

U.S. PATENT DOCUMENTS 4,042,132 A * 8/1977 Bohman et al. ................ 414/335
4,529,348 A * 7/1985 Johnson et al. ................ 414/335

(Continued)

FOREIGN PATENT DOCUMENTS

EP 2138027 A1 12/2009
EP 2301318 B1 11/2011

(Continued)

OTHER PUBLICATIONS

Borthwick, James Robert; Mining Haul Truck Pose Estimation and Load Profiling Using Stereo Vision. Aug. 2009. The University of British Columbia (Vancouver).

(Continued)

*Primary Examiner* — Thomas G Black
*Assistant Examiner* — Sara Nelson

(57) ABSTRACT

A mode controller determines whether to use an automated control mode of the spout or operator-directed manual control mode of the spout, based on a first operational status of a first location determining receiver associated with the propelling vehicle, a second operational status of a second location determining receiver associated with the harvesting vehicle, a third operational status of the imaging device or devices. In the automated control mode, an image processing module is adapted to facilitate the determination of the relative position of the spout and the storage portion and to generate command data place the storage portion and spout in relative cooperative alignment for transferring of material into the storage portion.

27 Claims, 11 Drawing Sheets

(56) References Cited

U.S. PATENT DOCUMENTS

| | | | |
|---|---|---|---|
| 5,524,424 A | 6/1996 | Halgrimson et al. | |
| 5,575,316 A | 11/1996 | Pollklas | |
| 5,646,844 A | 7/1997 | Gudat et al. | |
| 5,712,782 A | 1/1998 | Weigelt et al. | |
| 5,749,783 A | 5/1998 | Pollklas | |
| 5,751,576 A | 5/1998 | Monson | |
| 6,216,071 B1 | 4/2001 | Motz | |
| 6,591,145 B1 | 7/2003 | Hoskinson et al. | |
| 6,682,416 B2 | 1/2004 | Behnke et al. | |
| 6,687,616 B1 | 2/2004 | Peterson et al. | |
| 6,732,024 B2 | 5/2004 | Wilhelm Rekow et al. | |
| 6,859,729 B2* | 2/2005 | Breakfield et al. | 701/2 |
| 6,943,824 B2* | 9/2005 | Alexia et al. | 348/89 |
| 7,277,784 B2* | 10/2007 | Weiss | 701/50 |
| 7,648,413 B2 | 1/2010 | Duquesne et al. | |
| 8,060,283 B2 | 11/2011 | Mott et al. | |
| 8,306,726 B2* | 11/2012 | Donnelli et al. | 340/989 |
| 8,428,829 B2 | 4/2013 | Brunnert et al. | |
| 8,451,139 B2* | 5/2013 | Morselli et al. | 340/901 |
| 8,662,972 B2* | 3/2014 | Behnke et al. | 460/119 |
| 8,781,692 B2* | 7/2014 | Kormann | 701/50 |
| 2003/0217539 A1* | 11/2003 | Grossjohann et al. | 56/153 |
| 2007/0037621 A1* | 2/2007 | Isfort | 460/114 |
| 2009/0044505 A1 | 2/2009 | Huster et al. | |
| 2009/0222160 A1 | 9/2009 | Morselli et al. | |
| 2010/0063673 A1* | 3/2010 | Anderson | 701/34 |
| 2010/0063692 A1 | 3/2010 | Madsen et al. | |
| 2010/0070145 A1* | 3/2010 | Foster et al. | 701/50 |
| 2010/0108188 A1 | 5/2010 | Correns et al. | |
| 2010/0274434 A1* | 10/2010 | Donnelli et al. | 701/29 |
| 2010/0274452 A1* | 10/2010 | Ringwald et al. | 701/50 |
| 2010/0332051 A1 | 12/2010 | Kormann | |
| 2011/0022273 A1* | 1/2011 | Peters et al. | 701/42 |
| 2011/0061762 A1 | 3/2011 | Madsen et al. | |
| 2011/0066337 A1* | 3/2011 | Kormann | 701/50 |
| 2011/0205084 A1 | 8/2011 | Morselli et al. | |
| 2012/0215394 A1* | 8/2012 | Wang et al. | 701/24 |

FOREIGN PATENT DOCUMENTS

| | | |
|---|---|---|
| EP | 2311307 B1 | 12/2011 |
| EP | 2020174 B1 | 2/2012 |
| JP | 2177815 A | 7/1990 |
| WO | 2011101458 A1 | 8/2011 |

OTHER PUBLICATIONS

Singh, Sanjiv; and Digney, Bruce; Autonomous Cross-Country Navigation Using Stereo Vision. Jan. 1999. Carnegie Mellon University. Pittsburgh, PA.

AgCam Photo Album [online]. 2009 [retrieved on Oct. 3, 2012]. Retrieved from the Internet: <URL: http://dakotamicro.com/docs/AgCam Photo Album.pdf>.

CLAAS, Agritechnica 2009; Two Golds and a Silver for CLAAS [online], 2009 [retrieved on Oct. 3, 2012]. Retrieved from the Internet: <URL: http://www.claas.com/cl-gr/en/press/mitteilungen/2009/start,%20cid=565120,bpSite=35108, lang=en_UK.html>.

The International Search Report and the Written Opinion of the International Searching Authority, dated Apr. 15, 2013 (19 pages).

The International Search Report and the Written Opinion of the International Searching Authority, dated Apr. 17, 2013 (11 pages).

* cited by examiner

METHOD AND STEREO VISION SYSTEM FOR FACILITATING THE UNLOADING OF AGRICULTURAL MATERIAL FROM A VEHICLE

RELATED APPLICATION

This application claims the benefit of the filing date of and priority to U.S. Provisional Application Ser. No. 61/597,374, filed Feb. 10, 2012, which is hereby incorporated by reference in its entirety.

JOINT RESEARCH AGREEMENT

This application resulted from work performed under or related to a joint research agreement between Carnegie Mellon University and Deere & Company, entitled "Development Agreement between Deere & Company and Carnegie Mellon University," dated Jan. 1, 2008 and as such is entitled to the benefits available under 35 U.S.C. §103(c).

FIELD OF THE INVENTION

This invention relates to a method and stereo vision system for facilitating the unloading of agricultural material from a vehicle.

BACKGROUND

Certain prior art systems may attempt to use global positioning system (GPS) receivers to maintain proper spacing between two vehicles during the unloading or transferring of agricultural material between the vehicles. However, such prior art systems are susceptible to misalignment of the proper spacing because of errors or discontinuities in the estimated position of the GPS receivers. For example, one or more of the GPS receivers may misestimate its position because of electromagnetic interference, multipath propagation of the received satellite signals, intermittent reception of the satellite signals or low received signal strength of the satellite signals, among other things. Thus, there is a need for an improved system for managing the unloading of agricultural material from a vehicle to compensate for or address error in the estimated positions or alignment of the vehicles.

SUMMARY OF THE INVENTION

The system and method facilitates the transfer of agricultural material from a transferring vehicle (e.g., harvesting vehicle) to a receiving vehicle (e.g., grain cart). The system and method comprises a receiving vehicle, which has a propelled portion for propelling the receiving vehicle and a storage portion for storing agricultural material. A mode controller determines whether to use an automated control mode of the spout or operator-directed manual control mode of the spout, based on a first operational status of a first location determining receiver associated with the propelling vehicle, a second operational status of a second location determining receiver associated with the harvesting vehicle, a third operational status of the imaging device or devices. In the automated control mode, an image processing module is adapted to facilitate the determination of the relative position of the spout and the storage portion and to generate command data place the storage portion and spout in relative cooperative alignment for transferring of material into the storage portion.

DESCRIPTION OF THE PREFERRED EMBODIMENT

Figure 1:
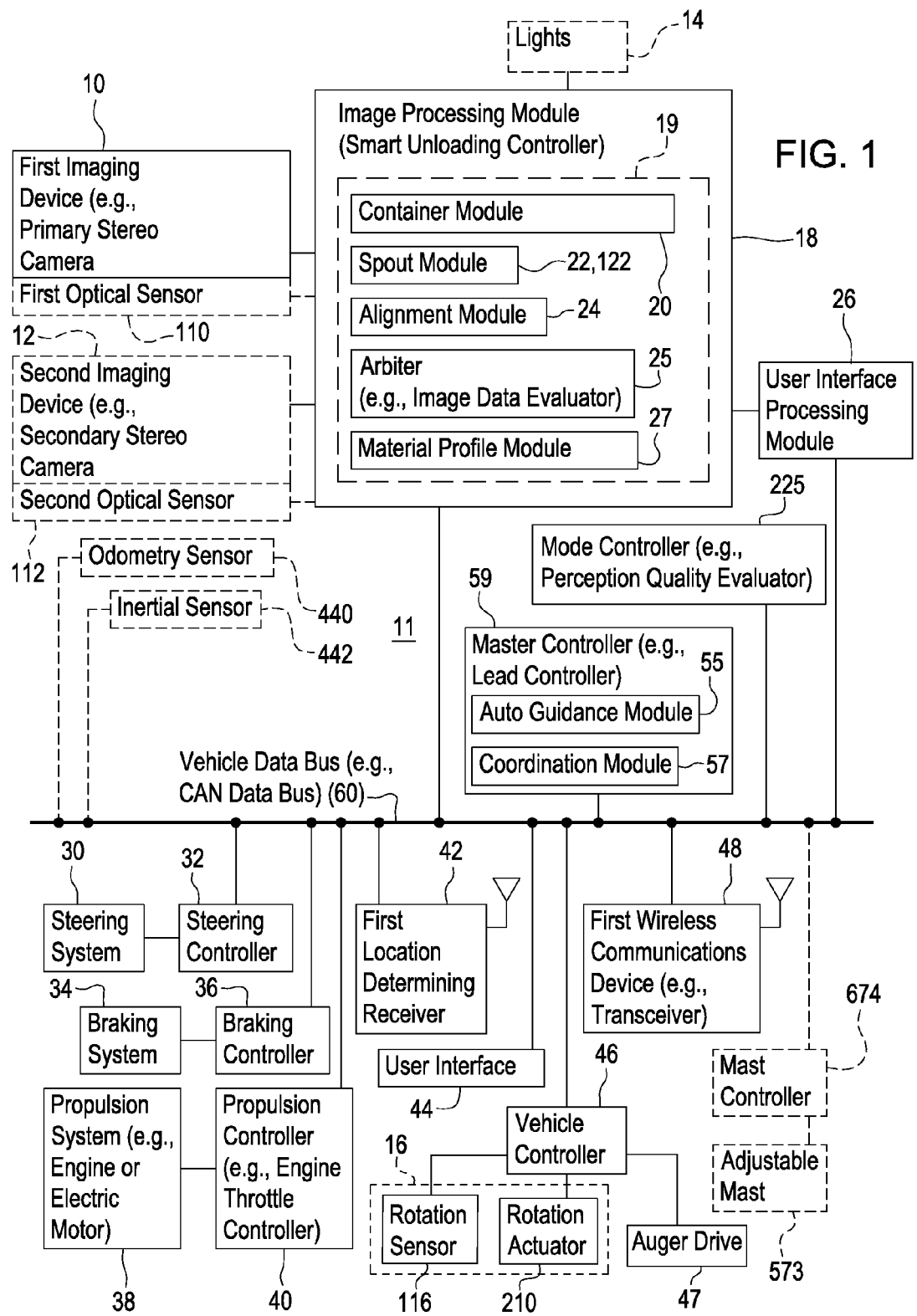
FIG. 1 is a block diagram of one embodiment of a machine vision-augmented guidance system for a transferring vehicle for facilitating the unloading of agricultural material from the transferring vehicle (e.g., combine).

In accordance with one embodiment, FIG. 1 shows a machine vision-augmented guidance system 11 for a transferring vehicle for managing the unloading of agricultural material (e.g., grain) from the transferring vehicle (e.g., combine) to a receiving vehicle (e.g., grain cart or wagon). A transferring vehicle may have a spout for directing agricultural material toward a storage portion of the receiving vehicle. For example, a stereo imaging system augments satellite navigation receivers or location-determining receivers (42, 142) for guidance of one or more vehicles. In one embodiment, the system 11 comprises a first imaging device 10 and second imaging device 12 coupled to an image processing module 18. The first imaging device 10 may be mounted on the transferring vehicle. The first imaging device 10 may comprise a primary stereo camera, while the second imaging device 12 may comprise a secondary stereo camera. In one configuration, the second imaging device 12 or secondary stereo camera is optional and provides redundancy to the first imaging device 10 in case of failure, malfunction or unavailability of image data from the first imaging device 10.

The first imaging device 10 and the second imaging device 12 may provide digital data format output as stereo video image data or a series of stereo still frame images at regular or periodic intervals, or at other sampling intervals. Each stereo image (e.g., the first image data or the second image data) has two component images of the same scene or a portion of the same scene. For example, the first imaging device 10 has a first field of view of the storage portion of the receiving vehicle, where the first field of view overlaps at least partially with a second field of view of the second imaging device 12 (if present). In one embodiment, the first imaging device 10, the second imaging device 12, or both may comprise a charge-coupled device (CCD), a complementary metal-oxide semiconductor (CMOS) array, or another suitable device for detection or collection of image data.

In one configuration, an optical sensor (110, 112) comprises a light meter, a photo-sensor, photo-resistor, photo-sensitive device, or a cadmium-sulfide cell. A first optical sensor 110 may be associated with the first imaging device 10; a second optical sensor may be associated with the second imaging device 12. The first optical sensor 110 and the second optical sensor 112 each may be coupled to the image processing module 18. The optical sensor (110, 112) provides a reading or level indicative of the ambient light in the field of view of its respective imaging device (10, 12).

Figure 5A:
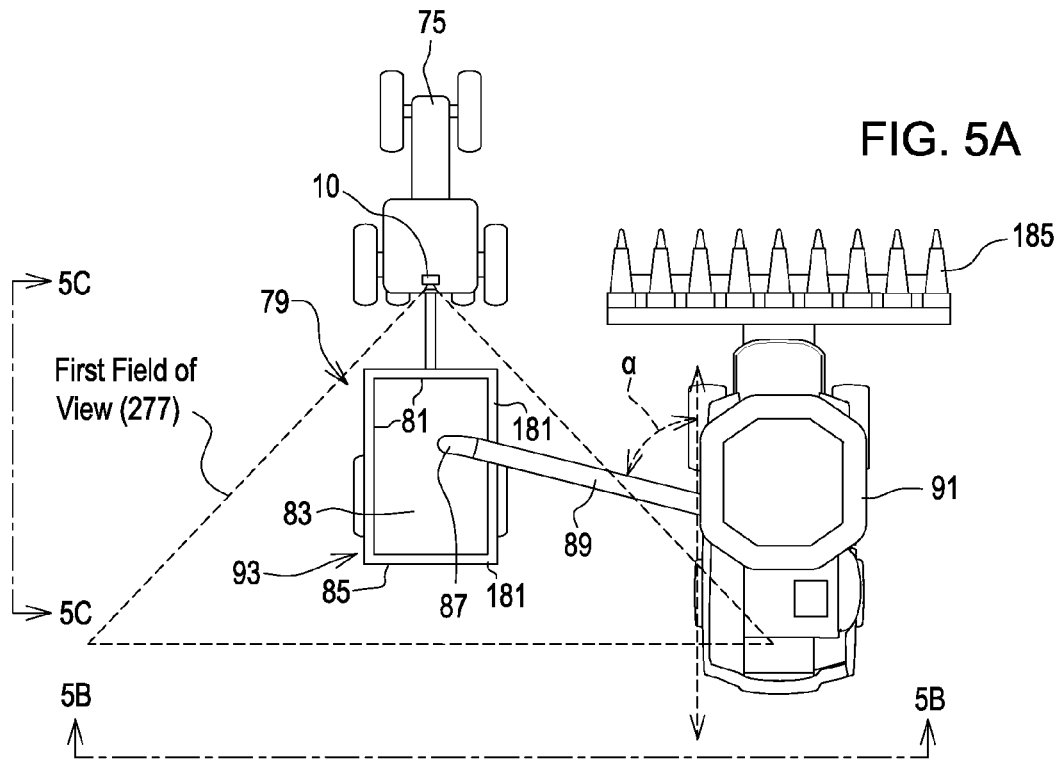
FIG. 5A illustrates a plan view of an imaging device (e.g., a stereo vision system) mounted on a receiving vehicle and facing a storage portion of the receiving vehicle.

The image processing module 18 may be coupled, directly or indirectly, to optional lights 14 on a vehicle (e.g., transferring vehicle) for illumination of a storage container (e.g., 85 in FIG. 5A) and/or spout (e.g., 89 in FIG. 5A). For example, the image processing module 18 may control drivers, relays or switches, which in turn control the activation or deactivation of optional lights 14 on the transferring vehicle. The optional lights 14 are shown in dashed lines because the lights 14 are optional and may be deleted in certain alternate embodiments. The image processing module 18 may activate the lights 14 on the vehicle for illumination of the storage container (e.g., 85 in FIG. 5A), spout 89 or both if an optical sensor (110, 112) or light meter indicates that an ambient light level is below a certain minimum threshold. In one configuration the optical sensor (110, 112) face toward the same direction as the lens or aperture of the imaging devices (10, 12).

In one embodiment, an auger rotation system 16 may comprise: (1) a rotation angle sensor 116 for sensing a spout rotation angle ($\alpha$ in FIG. 5A and $\beta$ in FIG. 5B) of the spout 89 with respect to one or more axes of rotation and (2) an actuator 216 for moving the spout 89 to change the spout rotation angle; hence, the spout position with respect to the receiving vehicle 79 or its storage container 85. The actuator 216 may comprise a motor, a linear motor, an electro-hydraulic device, a ratcheting or cable-actuated mechanical device, or another device for moving the spout 89, or the spout end 87. The spout rotation angle may comprise a simple angle, a compound angle or multi-dimensional angles that is measured with reference to a reference axis parallel to the direction of travel of the transferring vehicle. In one configuration, one or more of the following communicates with the vehicle controller 46 through transmission line or a secondary data bus: a rotation sensor 116, a rotation actuator 210, an auger rotation system 16, or an auger driver 47.

If the actuator 216 comprises an electro-hydraulic device, the use of proportional control valves in the hydraulic cylinder of the electro-hydraulic device that rotates the spout (or changes the spout rotation angle) facilitates finer adjustments to the spout angle (e.g., $\alpha$) than otherwise possible. Accordingly, proportional control valves of the electro-hydraulic device support or actuator 216 supports an even profile or distribution of unloaded agricultural material within the storage portion 93 or container 85. Many commercially available combines are typically equipped with non-proportional control valves for controlling spout angle or movement of the spout 89; electro-hydraulic devices with non-proportional control valves can fill the storage container with an inefficient multi-modal or humped distribution (e.g., 508) of agricultural material with local high areas and local low areas, as depicted in FIG. 5C, for example.

A vehicle controller 46 may be coupled to the vehicle data bus 60 to provide a data message that indicates when the auger drive 47 for unloading agricultural material from the transferring vehicle is activate and inactive. The auger drive 47 may comprise an auger, an electric motor for driving the auger, and a rotation sensor for sensing rotation or rotation rate of the auger or its associated shaft. In one embodiment, the auger (not shown) is associated with a container for storing agricultural material (e.g., a grain tank) of a transferring vehicle (e.g., a combine). If the vehicle controller 46 (e.g., auger controller) indicates that the auger of the transferring vehicle is rotating or active, the imaging processing module 18 activates the spout module 22 and container module 20. Thus, the auger rotation system 16, or its associated vehicle controller 46, may conserve data processing resources or energy consumption by placing the container module 20 and the spout module 22 in an inactive state (or standby mode) while the transferring vehicle is harvesting, but not unloading, the agricultural material to the receiving vehicle.

In FIG. 1, the imaging processing module 18 or any other controller may comprise a controller, a microcomputer, a microprocessor, a microcontroller, an application specific integrated circuit, a programmable logic array, a logic device, an arithmetic logic unit, a digital signal processor, or another data processor and supporting electronic hardware and software. In one embodiment, the image processing module 18 comprises a container module 20, a spout module 22, an alignment module 24, a material profile module 27, and an arbiter 25.

The image processing module 18 may be associated with a data storage device 19. The data storage device 19 may comprise electronic memory, non-volatile random access memory, a magnetic disc drive, an optical disc drive, a magnetic storage device or an optical storage device, for example. If the container module 20, the spout module 22 and the alignment module 24, material profile module 27 and arbiter 25, are software modules they are stored within the data storage device 19.

The container module 20 identifies a set of two-dimensional or three dimensional points (e.g., in Cartesian coordinates or Polar coordinates) in the collected image data or in the real world that define at least a portion of the container perimeter (e.g., 81 in FIG. 5A) of the storage portion (e.g., 85 in FIG. 5A). The set of two-dimensional or three dimensional points correspond to pixel positions in images collected by the first imaging device 10, the second imaging device 12, or both. The container module 20 may use or retrieve container reference data.

The container reference data comprises one or more of the following: reference dimensions (e.g., length, width, height), volume, reference shape, drawings, models, layout, and configuration of the container 85, the container perimeter 81, the container edges 181; reference dimensions, reference shape, drawings, models, layout, and configuration of the entire storage portion 93 of receiving vehicle; storage portion wheelbase, storage portion turning radius, storage portion hitch configuration of the storage portion 93 of the receiving vehicle; and distance between hitch pivot point and storage portion wheelbase. The container reference data may be stored and retrieved from the data storage device 19 (e.g., non-volatile electronic memory). For example, the container reference data may be stored by, retrievable by, or indexed by a corresponding receiving vehicle identifier in the data storage device 19 of the transferring vehicle system 11. For each receiving vehicle identifier, there can be a corresponding unique container reference data stored therewith in the data storage device 19.

In one embodiment, the transferring vehicle receives a data message from the receiving vehicle in which a vehicle identifier of the receiving vehicle is regularly (e.g., periodically transmitted). In another embodiment, the transferring vehicle interrogates the receiving vehicle for its vehicle identifier or establishes a communications channel between the transferring vehicle and the receiving vehicle in preparation for unloading via the wireless communication devices (48, 148). In yet another embodiment, the receiving vehicle transmits its vehicle identifier to the transferring vehicle when the receiving vehicle approaches the transferring vehicle within a certain radial distance. In still another embodiment, only one known configuration of receiving vehicle is used with a corresponding transferring vehicle and the container reference data is stored or saved in the data storage device 19. In the latter embodiment, the transferring vehicle is programmed, at least temporarily, solely for receiving vehicles with identical containers, which are identical in dimensions, capacity, proportion and shape.

In one configuration, the container module 18 identifies the position of the controller as follows. If the linear orientation of a set of pixels in the collected image data conforms to one or more edges 181 of the perimeter (81 in FIG. 5A) of the container (85 in FIG. 5A) as prescribed by the container reference data, the position of the container has been identified. A target zone, central region or central zone of the container opening 83 of the container 85 can be identified by dividing (by two) the distance (e.g., shortest distance or surface normal distance) between opposite sides of the container, or by identifying corners of the container and where diagonal lines that intercept the corners intersect, among other possibilities. In one configuration, the central zone may be defined as an opening (e.g., circular, elliptical or rectangular) in the container with an opening surface area that is greater than or equal to the cross-sectional surface area of the spout end by a factor of at least two, although other surface areas fall within the scope of the claims. The spout module 22 identifies one or more of the following: (1) the spout pixels on at least a portion of the spout 89 (in FIG. 5A), or (2) spout end pixels that are associated with the spout end 87 of the spout 89 (in FIG. 5A). The spout module 22 may use color discrimination, intensity discrimination, or texture discrimination to identify background pixels from one or more selected spout pixels with associated spout pixel patterns or attributes (e.g., color or color patterns (e.g., Red Green Blue (RGB) pixel values), pixel intensity patterns, texture patterns, luminosity, brightness, hue, or reflectivity) used on the spout 89 or on the spout end 87 of the spout 89 for identification purposes.

The alignment module 24, the master controller 59, or both estimate or determine motion commands at regular intervals to maintain alignment of the spout 56 over the central zone, central region or target of the container 85 for unloading agricultural material. The alignment module 24, the master controller 59, or both, may send commands or requests to the transferring vehicle with respect to its speed, velocity or heading to maintain alignment of the position of the transferring vehicle with respect to the receiving vehicle. For example, the alignment module 24 may transmit a request for a change in a spatial offset between the vehicles to the master controller 24. In response, the master controller 59 or the coordination module 57 transmits a steering command or heading command to the steering controller 32, a braking or deceleration command to a braking system 34, and a propulsion, acceleration or torque command to a propulsion controller 40 to achieve the target spatial offset or change in spatial offset. Further, similar command data may be transmitted via the wireless communication devices (48, 148) to the receiving vehicle for observational purposes or control of the receiving vehicle via its steering system controller 32, its braking controller 36, and its propulsion controller 40 of the system 311 of FIG. 3A.

Figure 3A:
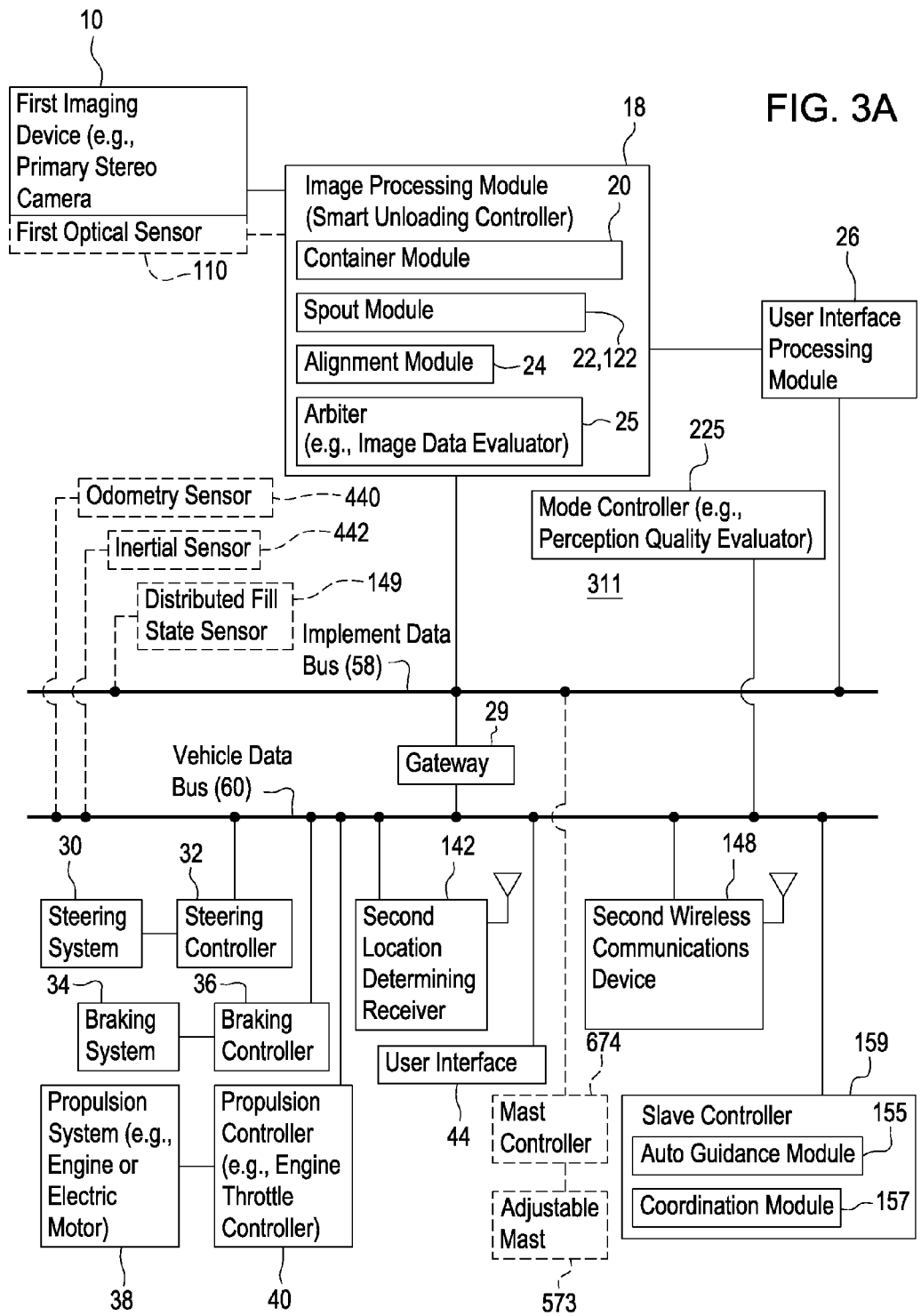
FIG. 3A is a block diagram of an embodiment of a machine vision-augmented guidance system for a receiving vehicle for facilitating the unloading of agricultural material from a transferring vehicle to the receiving vehicle (e.g., grain cart and tractor).
Figure 3B:
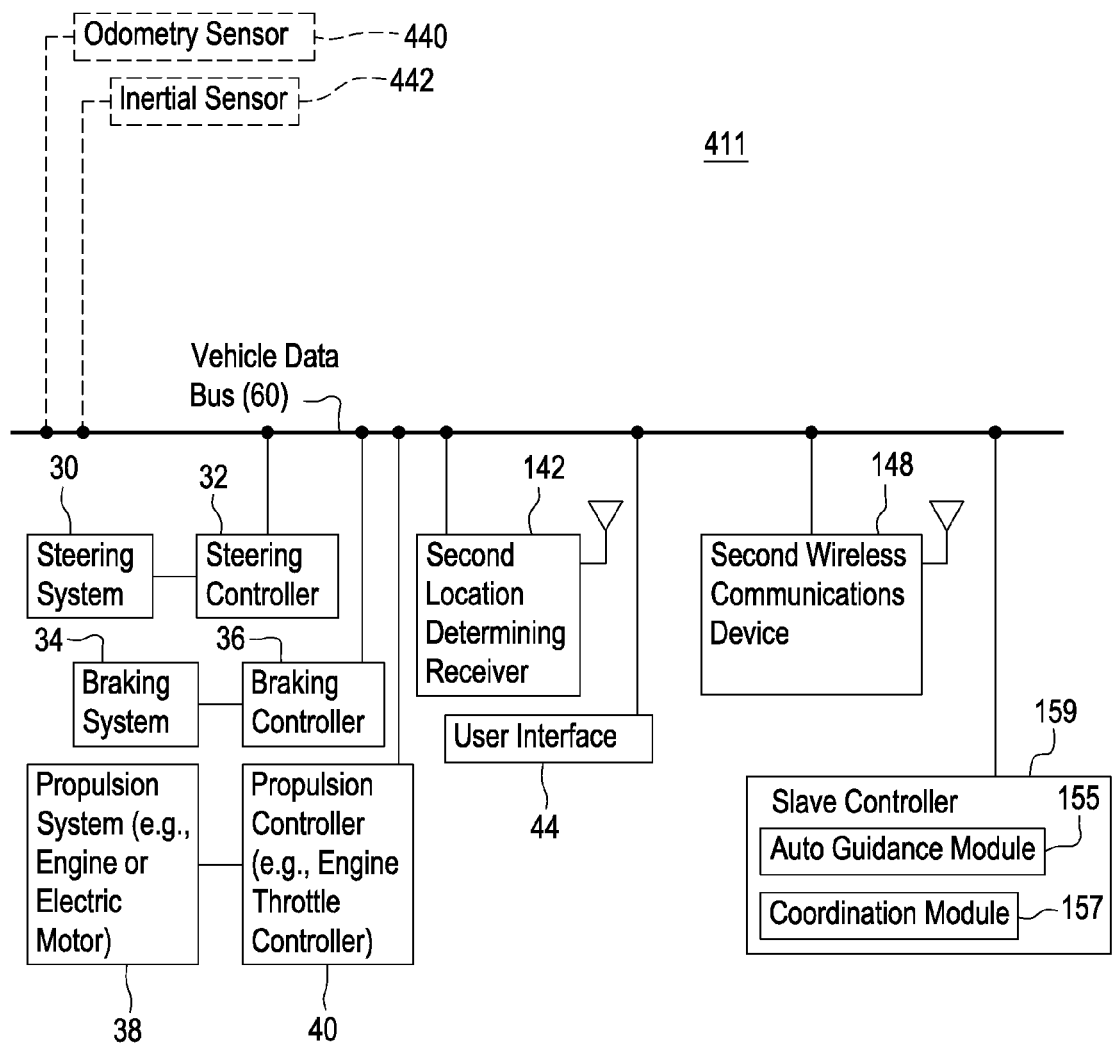
FIG. 3B is a block diagram of an embodiment of an electronic or guidance system for a receiving vehicle for cooperation with the machine vision-augmented guidance system of FIG. 1 or FIG. 2.

In another configuration, the alignment module 24 or image processing module 18 may regularly or periodically move, adjust or rotate the target zone or central zone during loading of the container 85 of the receiving vehicle to promote even filling, a uniform height, or uniform distribution of the agricultural material in the entire container 85, where the image processing module 18 identifies the fill state of the agricultural material in the image data from the material profile module 27 or receives fill state data from distributed fill state sensors 149 in FIG. 3A or FIG. 3B (associated with the container 85) via the wireless communication devices (148, 149).

The imaging module 18 may comprise material profile module 27 or a fill level sensor for detecting a one-dimensional, two-dimensional or three-dimensional representation of the fill level or volumetric distribution of the agricultural material in the container 85 or storage portion 93. For example, FIG. 5C shows various illustrative two-dimensional representations of the fill state of the container 85, or the distribution of agricultural material in the container 85, where FIG. 5C will be described later in detail.

In one configuration, the coordination module 57 or the steering controller 32 adjusts the relative position (of offset) of the transferring vehicle to the receiving vehicle. For example, the steering controller 32 associated with the steering system 30 of the transferring vehicle can steer the transferring vehicle in accordance with a cooperative alignment (e.g., that is suitable for efficiently transferring material from the transferring vehicle to the receiving vehicle, while both are in generally forward motion) based on location data and motion data from first location-determining receiver 42 and the second location-determining receiver 142. With or without such location and motion data from the one or more location-determining receivers (42, 142), the alignment module 24, the coordination module 57 and the auger rotation system 116 may control the relative position of the spout 89 or the spout end 87 to the container perimeter 81 to achieve an even fill to the desired fill level. For example, actuator 216 or the auger rotation system 16, alone or in combination with its vehicle controller 46, may adjust the spout angle (e.g., a first spout angle ($\alpha$) or rotation angle, a second spout angle ($\beta$) or tilt angle, or a compound angle ($\alpha$ and $\beta$)) that the spout 89 makes with respect to a reference axis or reference coordinate system associated with the transferring vehicle 91 or a generally vertical plane associated with the direction of travel of the transferring vehicle 91, where the spout 89 meets and rotates with respect to the vehicle.

The spout end 87 may be adjusted for unloading agricultural material by shifting its spout angle or spout position, within the container perimeter 81 and a tolerance clearance from the container perimeter 81 within the container 85. The spout end 87 may be adjusted by various techniques that may be applied alternately, or cumulatively. Under a first technique, the alignment module 24 adjusts the spout end 87 for unloading agricultural material by shifting its spout angle (e.g., a first spout angle ($\alpha$) or rotation angle, a second spout angle ($\beta$) or tilt angle, or both.) The rotation actuator (210 or 260), or the rotation actuator 260 and the tilt actuator 262 may adjust the rotation angle, the tilt angle, or both with respect to the transferring vehicle to place the spout 89 or spout end 87 in cooperative alignment based on the collected image data for a sampling period.

Under a second technique, the alignment module 24 requests (or commands) the coordination module 57 to adjust the fore/aft offset adjustment ($\Phi$ or $\phi$), the lateral adjustment ($\Delta$), or both, where the coordination module 57 manages or choreographs the relative fore/aft offset and lateral offset between the transferring vehicle and receiving vehicle. Under a third technique, the alignment module 24 primarily adjusts the spout end 87 for unloading agricultural material by shifting its spout angle and the coordination module 57 secondarily and regularly (e.g., periodically) moves the fore/aft offset and the lateral offset by fore/aft offset adjustment ($\Phi$ or $\phi$), the lateral adjustment ($\Delta$), respectively, to achieve a uniform fill state or level loading of the container with the agricultural material. Accordingly, the spout end 87 may be adjusted regularly (e.g., in a matrix of one or more rows or columns of preset offset positions) for unloading agricultural material by shifting the spatial relationship between the transferring vehicle and the receiving vehicle by a fore and aft offset or a lateral offset to achieve a target alignment or desired even distribution of filling the container 85 or storage portion 93 with agricultural material, while using the spout angle adjustment for fine tuning of the distribution of the agricultural material within the container (e.g., from each position within the matrix).

In the image processing module 18, the arbiter 25 comprises an image data evaluator. For example, the arbiter 25 may comprise an evaluator, a judging module, Boolean logic circuitry, an electronic module, a software module, or software instructions for determining: (1) whether or not to use the first image data, the second image data, or both, and/or (2) whether or not to use the image processing module 18 (or its output data) for alignment of a relative position of the spout and the container perimeter (or alignment of the spatial offset between the vehicles). In one embodiment the arbiter determines whether or not to use the first image data, the second image data, and the output data of the image processing module 18 based on evaluation one or more of the following metrics, factors or criteria during one or more sampling periods: material variation of intensity of pixel data, material variation in ambient light conditions during, image rectification quality, disparity image quality, stereo correspondence data quality, reliability, extent or degree of identification of edges of one or more image objects (e.g., spout, spout end, container perimeter, storage portion) or image data quality, reliability of coordinate estimation (e.g., three dimensional coordinates) of one or more objects in the image. The arbiter 25 may communicate one or more quality indicators (e.g., third indicator message) to the mode controller 225 (e.g., via a data bus, a logical data path, a physical data path, or a virtual data path).

A mode controller 225 is coupled to the data bus (e.g., 31). The mode controller 225 may comprise a perception quality evaluator, a judging module, Boolean logic circuitry, an electronic module, a software module, or software instructions for determining whether to operate the machine-vision-augmented guidance system (e.g., 11, 111, or 311) in: (1) an operator-directed manual mode in which one or more human operators steer the receiving vehicle, the transferring vehicle or both during transfer of agricultural material from the transferring vehicle to the steering vehicle; (2) an automated mode in which the receiving vehicle, the transferring vehicle or both are steered and aligned automatically during transfer of agricultural material from the transferring vehicle to the receiving vehicle; or (3) a semi-automated mode or partially automated mode in which one or more operators supervise and can override the automated steering and alignment of the transferring vehicle and the receiving vehicle. For example, the mode controller 225 may determine whether to use an automated control mode of the spout or an operator-directed manual control mode of the spout based on a first operational status of a first location determining receiver 42 associated with the transferring vehicle, a second operational status of a second location determining receiver 142 associated with the receiving vehicle, and a third operational status of the first imaging device 10 or an image processing module 18 (e.g., on the transferring vehicle or the receiving vehicle).

In one configuration, the automated control mode comprises an operational mode where an image processing module 18 processes the collected image data to facilitate the determination of the relative position of the spout 89 (e.g., the spout end 87) and the storage portion 93 (or its container perimeter or a central zone of the storage portion 93). Further, in the automated control mode, the image processing module 18 may generate command data to place the storage portion 93 (or its container perimeter or central zone) and the spout 89 (e.g., the spout end 87) such that the spout is aligned for transferring of agricultural material into the storage portion 93. The command data may comprise one or more of the following: steering command data for the receiving vehicle, steering command data for the transferring vehicle, or actuator command data for rotating or otherwise manipulating any actuators (e.g. for rotation, tilt or deflection) of the spout.

In one embodiment, the mode controller 225 comprises a perception quality evaluator that evaluates the functionality, diagnostics, performance, tests or quality of one or more location determining receivers (42, 142), imaging devices (10, 12), range finders, odometry sensors (440), dead-reckoning sensors, inertial sensors (442), navigation sensors, or other perception sensors. In one illustrative example, the first operational status is acceptable if the first location determining receiver 42 provides reliable position data that meets or exceeds a dilution of precision threshold or another navigation satellite reliability measure during a sampling period; the second operational status is acceptable if the second location determining receiver 142 provides reliable position data that meets or exceeds a dilution of precision threshold or another navigation satellite reliability measure (e.g., total equivalent user range error) during a sampling period. Further, the third operational status is acceptable if the first imaging device 10 provides reliable image data in which the container module 20 or spout module 22 (e.g., or the respective edge detection modules therein) are capable of any of the following: (1) reliably identifying or resolving one or more edges of spout 89, the spout end 87, the container perimeter 81 or a portion thereof, or the storage portion 93 in the collected image data during a sampling time period, (2) reliably identifying on a time percentage basis (e.g., at least 99.99% of the time) one or more reference objects (e.g., a reference pattern or reference image on the spout or receiving vehicle) or objects in the image data, (3) reliably determining (e.g., via stereo correspondence or disparity processing) coordinates (e.g., in three dimensions) of a material portion (e.g., a group or constellation of reference points) on one or more of the following: the spout 89, the spout end 87, the storage portion, container perimeter or a portion thereof during a sampling period, or (4) reliably identifying (e.g., via an edge detector 105 or other processing) one or more edges of the spout end 87 and one or more edges of the container perimeter 81 of the storage portion.

Figure 2:
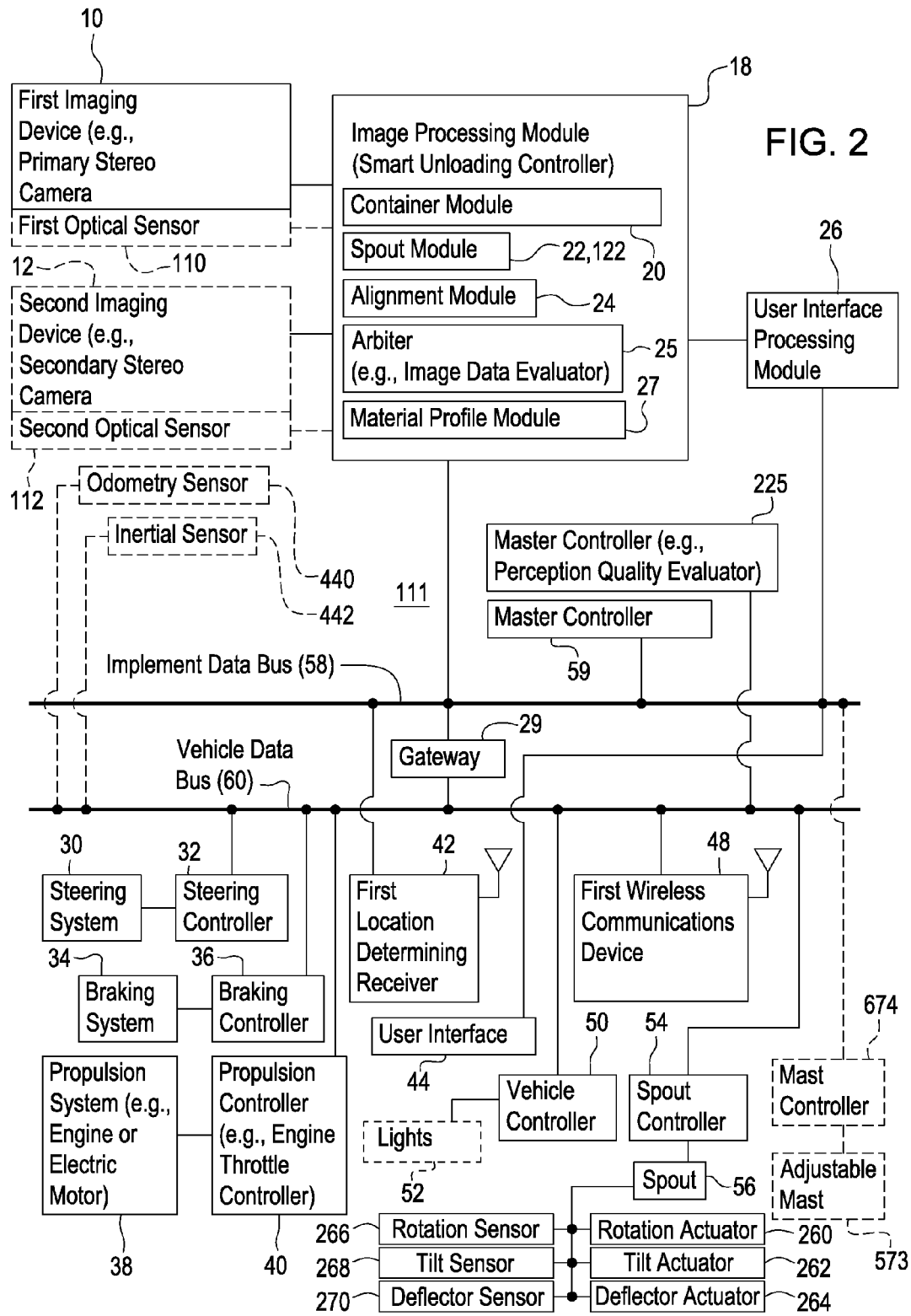
FIG. 2 is a block diagram of another embodiment of a machine vision-augmented guidance for a transferring vehicle for facilitating the unloading of agricultural material from the transferring vehicle (e.g., a self-propelled forage harvester).

In on configuration in FIG. 1 and FIG. 2, the systems (11 or 111) may use a detected rotation angle (of the spout 89) detected by the rotation sensor 116 and 266, respectively, along with a known length of the spout 89 to estimate the coordinates (e.g., in three dimensions) of the spout end 87. However, where the rotation angle or the rotation sensor (116 or 266) is not present, operating, or in communication with the image processing module 18, the spout module (22 or 122) may use image processing for any of the following: (1) to estimate a spout angle or rotation angle of the spout with respect to the transferring vehicle, (2) to estimate a position (e.g., three dimensional coordinates) of the spout 89, and (3) to estimate a position (e.g., three dimensional coordinates) of the spout end 87.

Dilution of precision provides a figure of merit of the performance of a location determining receiver (e.g., 42, 142) that uses a satellite navigation system, such as the Global Positioning System (GPS) or Global Navigation Satellite System (GLONASS). Dilution of precision captures the time-varying impact of spatial geometry and separation between a location determining receiver (42, 142) and satellites signals that are received by the location determining receiver, as opposed to clock errors, ionospheric errors, multipath errors, and other errors. The precision in pseudo-range estimate to each satellite can affect the accuracy of the determination of a three dimensional position estimate and time estimate of the location determining receiver (42, 142). If receivable navigation satellites are spatially too close together in orbit for a given location determining receiver a particular time, accuracy of the position estimate may be compromised and the dilution of precision value can be higher than normal or acceptable.

In one embodiment, the first location-determining receiver 42 provides a first indicator message that indicates that the first location-determining receiver 42 meets or exceeds a precision dilution threshold; the second location-determining receiver 142 provides a second indicator message that indicates that the second location-determining receiving 142 exceeds a precision dilution threshold; and the image processing module 18 provides a third indicator message that indicates that the image processing module 18 is capable of reliably identifying one or more edges of the spout end 87 and one or more edges of the container perimeter 81 of the storage portion 93 during a sampling period.

If the mode controller 225 is separate from the image processing module 18, any failure or disruption of the functioning of the image processing module 18, its hardware or its software is generally separate and distinct from any failure or disruption of the functioning of the mode controller 225, which adds a measure of redundancy and reliability to the system (e.g., 11 or 111). Although the mode controller 225 is shown separate and outside of the image processing module 18, in an alternate embodiment the mode controller 225 may be incorporated into the image processing module 18, which could potentially reduce the cost of the system (e.g., 11 or 111).

A master controller 59 is coupled to the data bus (e.g., 60). In one embodiment, the master controller 59 comprises an auto-guidance module 55 and coordination module 57. The auto-guidance module 55 or master controller 59 can control the transferring vehicle in accordance with location data from the first location determining receiver 42 and a path plan or desired vehicle path (e.g., stored in data storage 19). The auto-guidance module 55 or master controller 59 sends command data to the steering controller 32, the braking controller 36 and the propulsion controller 40 to control the path of the transferring vehicle to track automatically a path plan or to track manually steered course of an operator via the user interface 44 or steering system 30.

The coordination module 57 may facilitate alignment of movement (e.g., choreography) between the transferring vehicle (e.g., 91 in FIG. 4A) and the receiving vehicle (e.g., 79 in FIG. 4A) during unloading or transferring of agricultural material between the vehicles. For example, the coordination module 57 may facilitate maintenance of a uniform lateral offset ($\Delta$ in FIG. 4A) and a uniform fore/aft offset ($\Phi$ or $\phi$ in FIG. 4A) between the vehicles during unloading of the agricultural material, subject to any adjustments for attainment of a uniform distribution of material in the container 85. Collectively, the uniform lateral offset and uniform for/aft offset may be referred to as a uniform spatial offset. In certain embodiments, maintenance of the lateral offset and fore/aft offset, or coordination of any shift in the lateral offset and fore/aft offset (e.g., pursuant to a two-dimensional matrix of pre-established positions (x, y points) for uniform loading of a respective particular container or storage portion), is a necessary or desired precondition to implementing spout angle adjustment of the spout 89 or spout end 87 by the alignment module 24.

In one embodiment in a leader mode, the transferring vehicle is steered by the auto-guidance module 55 or the steering controller 32 in accordance with path plan, or by a human operator. The master controller 59 or coordination module 57 controls the receiving vehicle in a follower mode via the slave controller 159, where the transferring vehicle operates in the leader mode. If the transferring vehicle operates in an automated mode or auto-steering mode, the master controller 59 provides command data locally to the steering controller 32, braking controller 36, and propulsion engine controller 40 of the transferring vehicle. Such command data can be normalized (or scaled), time stamped, and communicated to the receiving vehicle via wireless communication devices (48, 148) for processing by the slave controller 159. Alternatively, the velocity, acceleration, and heading data of the transferring vehicle is communicated to the receiving vehicle via the wireless communications devices (48, 148) to enable to receiving vehicle to follow the path of the transferring vehicle (e.g., with a minimal time delay). In an automated mode and in a leader-follower mode, the receiving vehicle, the transferring vehicle or both are steered and aligned automatically during transfer of agricultural material from the transferring vehicle to the receiving vehicle.

The image processing module 18 provides image data to a user interface processing module 26 that provides, directly or indirectly, status message data and performance message data to a user interface 44. As illustrated in FIG. 1, the image processing module 18 communicates with a vehicle data bus 31 (e.g., Controller Area Network (CAN) data bus).

In one embodiment, a location determining receiver 42, a first wireless communications device 48, a vehicle controller 46, a steering controller 32, a braking controller 36, and a propulsion controller 40 are capable of communicating over the vehicle data bus 31. In turn, the steering controller 32 is coupled to a steering system 30 of the transferring vehicle; the braking controller 36 is coupled to the braking system 34 of the transferring vehicle; and the propulsion controller 40 is coupled to the propulsion system 38 of the transferring vehicle.

In FIG. 1, the steering system 30 may comprise an electrically-driven steering system, an electro-hydraulic steering system, a gear driven steering system, a rack and pinion gear steering system, or another steering system that changes the heading of the vehicle or one or more wheels of the vehicle. The braking system 34 may comprise a regenerative braking system, an electro-hydraulic braking system, a mechanical breaking system, or another braking system capable of stopping the vehicle by hydraulic, mechanical, friction or electrical forces. The propulsion system 38 may comprise one or more of the following: (1) the combination of an electric motor and an electric controller, (2) internal combustion engine that is controlled by an electronic fuel injection system or another fuel metering device that can be controlled by electrical signals, or (3) a hybrid vehicle in which an internal combustion engine drives a electrical generator, which is coupled to one or more electric drive motors.

The system 11 facilitates the transfer of agricultural material from the transferring vehicle (e.g., a harvesting vehicle) to a receiving vehicle. The system 11 comprises a receiving vehicle with a propelled portion for propelling the receiving vehicle and a storage portion 93 for storing agricultural material. A stereo imaging device, such as the first imaging device 10, faces towards the storage portion 93 of the receiving vehicle. As shown in FIG. 1, the first imaging device 10 and the optional second imaging device 12 are mounted on the transferring vehicle, consistent with FIG. 4A. However, in alternate embodiments, the first imaging device 10 and the optional second imaging device 12 may be mounted on the receiving vehicle or the propulsion portion 75 of the receiving vehicle as shown in FIG. 5A, or arranged in other possible configurations.

One or more imaging devices (10, 12) are arranged to collect image data. A container module 20 identifies a container perimeter 81 of the storage portion 93 in the collected image data. The storage portion 93 has an opening inward from the container perimeter for receipt of the agricultural material. A spout module 22 is configured to identify a spout (e.g., 89 of FIG. 4A) of the harvesting vehicle in the collected image data. An alignment module 24 is adapted for determining the relative position of the spout 89 and the container perimeter (81 of FIG. 4A) and for generating command data to the transferring vehicle or the propelled portion 75 of the receiving vehicle 79 to steer the storage portion 93 in cooperative alignment such that the spout 89 is aligned within a central zone 83 of the container perimeter 81. A steering controller 32 is associated with a steering system 30 of the propelled portion for steering the receiving vehicle in accordance with the cooperative alignment.

In one embodiment, an optional mast controller 674, indicated by dashed lines, is coupled to the vehicle data bus 60, the implement data bus, or the image processing module 18 to control an optional adjustable mast 573 for mounting and adjustably positioning the first imaging device 10, the second imaging device 12, or both. The mast controller 674 is adapted to change the orientation or height above ground of the first imaging device 10, the second imaging device 12 or both, where the orientation may be expressed as any of the following: a tilt angle, a pan angle, a down-tilt angle, a depression angle, or a rotation angle.

In one configuration, a user interface 44 is arranged for entering container reference data or dimensional parameters related to the receiving vehicle. For example, the container reference data or dimensional parameters comprise a distance between a trailer hitch or pivot point (which interconnects the propulsion unit 75 and the storage portion 93) and front wheel rotational axis of the storage portion 93 of the receiving vehicle 79.

In an alternate embodiment, in FIG. 1, the first imaging device 10 comprises a monocular imaging device and the second imaging device 12 comprises a monocular imaging device that provides first monocular image data and second monocular image data, respectively. The image processing module 18 or system (e.g., 11, 111 or 311) can create a stereo image from the first monocular image data (e.g., right image data) and the second monocular image data (e.g., left image data) with reference to the relative position and orientation of the first imaging device 10 and the second imaging device 12. The image processing module 18 determines: (1) at least two points on a common visual axis that bisects the lenses of both the first imaging device 10 and the second imaging device 12, and (2) a linear spatial separation between the first imaging device 10 and the second imaging device 12, where the first field of view 77 (in FIG. 4A) of the first imaging device 10 and the second field of view 177 of the second imaging device 12 overlap, at least partially, to capture the spout 89, the spout end 87 and the container perimeter 81 in the collected image data.

In an alternate embodiment, FIG. 1 further comprises an optional odometer sensor 440, and an optional inertial sensor 442, as illustrated by the dashed lines in FIG. 1. The odometer sensor 440 may comprise a magnetic rotation sensor, a gear driven sensor, or a contactless sensor for measuring the rotation of one or more wheels of the transferring vehicle to estimate a distance traveled by the transferring vehicle during a measurement time period, or a ground speed of the transferring vehicle. The odometry sensor 440 may be coupled to the vehicle data bus 60 or an implement data bus. The inertial sensor 442 may comprise one or more accelerometers, gyroscopes or other inertial devices coupled to the vehicle data bus 60 or an implement data bus. The optional odometry sensor 440 and the optional inertial sensor 442 may augment or supplement position data or motion data provided by the first location determining receiver 42.

Figure 4A:
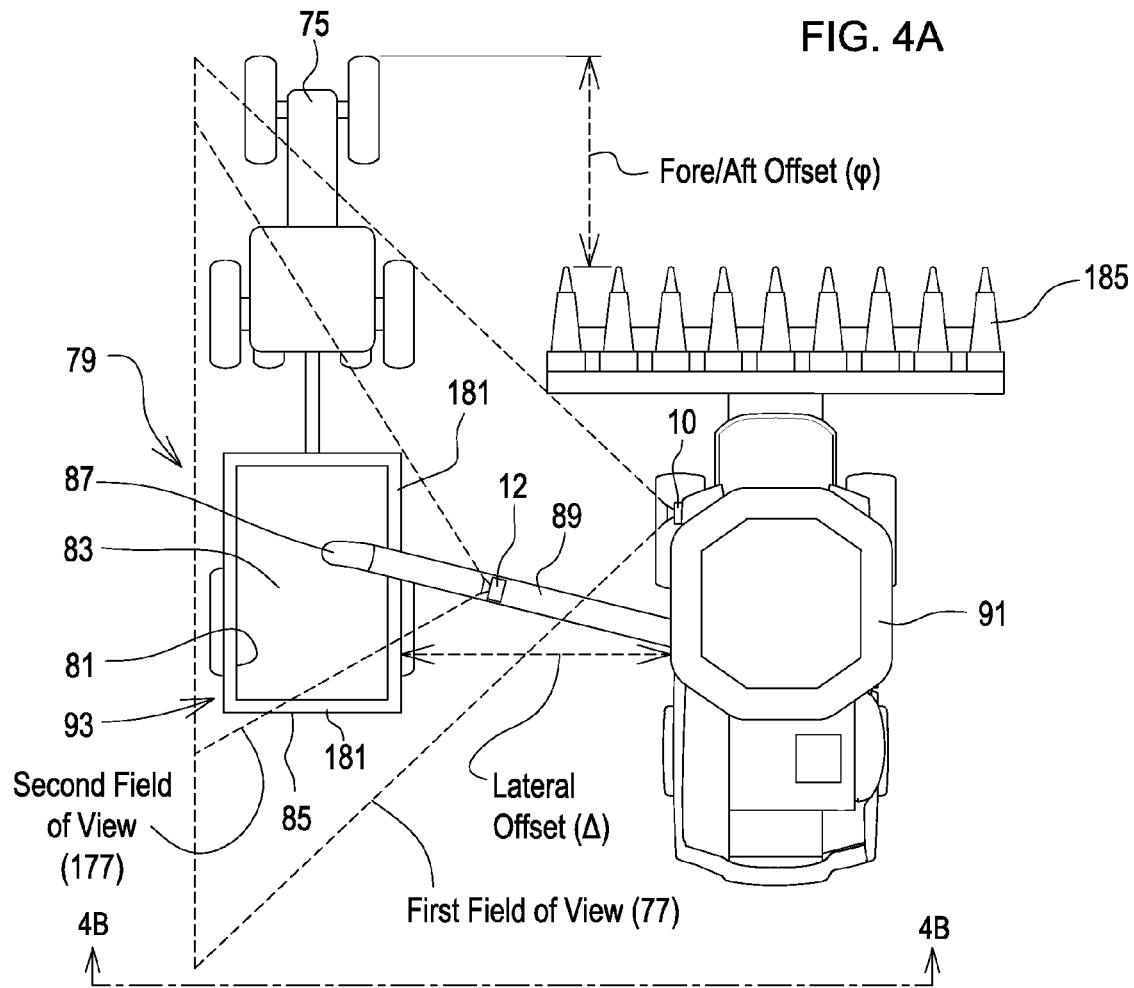
FIG. 4A illustrates a plan view of an imaging devices mounted on a transferring vehicle and facing toward a receiving vehicle.

The system 11 of FIG. 1 is well suited for use on a combine or harvester as the transferring vehicle. The system 11 of FIG. 1 may communicate and cooperate with a second system (311) on the receiving vehicle (e.g., as illustrated in FIG. 4A) to coordinate the relative alignment of the transferring vehicle and the receiving vehicle during unloading or transferring of material from the transferring vehicle. Like reference numbers in FIG. 1 and FIG. 2 indicate like elements.

The vision-augmented guidance system 111 of FIG. 2 is similar to the system 11 of FIG. 1; except that the system 111 of FIG. 2 further comprises an implement data bus 58, a gateway 29, and vehicle controllers 50 coupled to the vehicle data bus 60 for the optional lights 14 and spout 89. The vehicle controller 50 controls the lights 52; the spout controller 54 controls the spout 89 via one or more of the following: a rotation actuator 260, tilt actuator 262, or deflector actuator 264. A rotation actuator 260 may rotate the spout above a first axis that is generally perpendicular to the ground; a tilt actuator 262 may tilt or rotate the spout at an upward or downward angle along a second axis that may be generally parallel to the ground or substantially perpendicular to the first axis. The deflector actuator 264 may activate a deflector at or near a spout end 87 of the spout 89 to avoid overshooting the container or storage area of the receiving vehicle with harvested material, for example. In one embodiment, each of the rotation actuator 260, the tilt actuator 262, and the deflector actuator 264 may comprise a servo-motor, electric motor, or an electro-hydraulic mechanism for moving or adjusting the orientation or spout angle of the spout 89, or its spout end 87.

In one configuration, the spout controller 54 controls the spout 89 based on operator input or image processing module 18 based on sensor data from one or more of the following sensors: a rotation sensor 266, a tilt sensor 268, and a deflector sensor 270. A rotation sensor 260 measures a first angle of rotation of the spout above a first axis that is generally perpendicular to the ground; a tilt sensor 268 measures a second angle of rotation, or a tilt angle, of the spout at an upward or downward angle along a second axis that may be generally parallel to the ground or substantially perpendicular to the first axis. The deflector sensor 264 may measure a deflector angle or a deflector active status or inactive status at or near a spout end 87 of the spout 89 to avoid overshooting the container or storage area of a the receiving vehicle with harvested material, for example. In one embodiment, each of the rotation sensor 266, and the tilt sensor 268 may comprise a magnetic field sensor, a Hall Effect sensor, a magnetorestrictive sensor, a variable resistor, or another suitable sensor for measuring an angle between the spout 89 and the transferring vehicle, with respect to rotation along the first axis, the second axis, or otherwise. In one configuration, the deflector sensor 270 may comprise a contact sensor or contact switch to provide a status message or status signal indicative of whether the deflector is extended or retracted with respect to the spout end 87.

In one configuration, the implement data bus 58 may comprise a Controller Area Network (CAN) implement data bus. Similarly, the vehicle data bus 60 may comprise a controller area network (CAN) data bus. In an alternate embodiment, the implement data bus 58, the vehicle data bus 60, or both may comprise an ISO (International Organization for Standardization) data bus or ISOBUS, Ethernet or another data protocol or communications standard.

The gateway 29 supports secure or controlled communications between the implement data bus 58 and the vehicle data bus 60. The gateway 29 comprises a firewall (e.g., hardware or software), a communications router, or another security device that may restrict or prevent a network element or device on the implement data bus 58 from communicating (e.g., unauthorized communication) with the vehicle data bus 60 or a network element or device on the vehicle data bus 31, unless the network element or device on the implement data bus 58 follows a certain security protocol, handshake, password and key, or another security measure. Further, in one embodiment, the gateway 29 may encrypt communications to the vehicle data bus 60 and decrypt communications from the vehicle data bus 60 if a proper encryption key is entered, or if other security measures are satisfied. The gateway 29 may allow network devices on the implement data bus 58 that communicate via an open standard or third party hardware and software suppliers, whereas the network devices on the vehicle data bus 60 are solely provided by the manufacturer of the transferring vehicle (e.g., self-propelled forage harvester) or those authorized by the manufacturer.

In FIG. 2, a first location determining receiver 42, a user interface 44, a user interface processing module 26, and the gateway 29 are coupled to the implement data bus 58, although in other embodiments such elements or network devices may be connected to the vehicle data bus 60. Vehicle controller 50 and spout controller 54 are coupled to the vehicle data bus 60. In turn, the vehicle controller 50 and spout controller 54 are coupled, directly or indirectly, to optional lights 52 on the transferring vehicle and the spout 89 of the transferring vehicle (e.g., self propelled forage harvester). Although the system of FIG. 2 is well suited for use or installation on a self-propelled forage harvester, the system of FIG. 2 may also be applied to combines, harvesters or other heavy equipment.

The system 11 of FIG. 1 and the system 111 of FIG. 2 apply to the transferring vehicle, whereas the system of FIG. 3A and FIG. 3B apply to the receiving vehicle. Like reference numbers in FIG. 1, FIG. 2, FIG. 3A, and FIG. 3B indicate like elements. As previously noted, the transferring vehicle may comprise a combine, harvester, self-propelled harvester, vehicle or heavy equipment that collects or harvests material for transfer to the receiving vehicle. In one embodiment, the receiving vehicle may comprise a propelled portion (e.g., 75 in FIG. 4A) and a storage portion (e.g., 93 in FIG. 4A) for storing the material transferred from the transferring vehicle. The receiving vehicle may comprise the combination of a tractor and a grain cart or wagon, where the tractor is an illustrative example of the propelled portion 75 and where the grain cart is an illustrative example of the storage portion 93. Here, the system 311 of FIG. 3A is presented as an image processing system 18 that is alternatively on the receiving vehicle, instead of the transferring vehicle as in FIG. 1 and FIG. 2. In contrast, FIG. 3B is configured to cooperate with the system (11 or 111) of FIG. 1 or FIG. 2 as will be described later in detail.

The system of FIG. 3A comprises the first imaging device 10, the image processing module 18, the user interface processing module 26, the gateway 29, a second location-determining receiver 142, a second wireless communications device 148, the slave controller 159 among other devices illustrated in FIG. 3. In one embodiment, the first imaging device 10 is mounted on the propelled portion 75 (e.g., tractor) of the receiving vehicle facing backwards towards the storage portion 93 (e.g., cart) or container 85. The second wireless communications device 148 (of the receiving vehicle) is adapted for communicating data with the first communications device 48 (of the transferring vehicle) of FIG. 1 or FIG. 2, for example. The second location-determining receiver 142 provides position data, location data, altitude, velocity, or acceleration data.

In one embodiment, in FIG. 3A the image processing module 18 estimates the relative position of the transferring vehicle and the receiving vehicle, and the relative orientation of the spout end 87 to the storage portion 93 to direct or control the steering system 30, braking system 34, and propulsion system 38 of the receiving vehicle via one or more controllers (32,36,40) to place the transferring vehicle and receiving vehicle in a target transferring position for transferring of material from the spout end 87 to the storage portion 93. Meanwhile, the transferring vehicle may be controlled (steering, velocity, and acceleration) by its own operator or the first location-determining receiver 42. For example, the system 311 or image processing system 18 identifies the spout end 87, or the boot or tip of the spout where the material exits the spout 89 and computes (through stereo correspondence, disparity or other image processing) the relative position of the spout end 87 to the storage portion 93, the container perimeter of the storage portion 93, a central zone of the storage portion 93.

In FIG. 3A, a steering controller 32 associated with a steering system 30 of the receiving vehicle can steer the propelled portion of the receiving vehicle in accordance with a cooperative alignment (e.g., suitable for efficient transferring of material from the transferring material to the receiving vehicle) based on location data and motion data from the first location-determining receiver 42 and the second location-determining receiver 142. With or without such location and motion data from one or more location-determining receivers (42, 142), the image processing module 18 can use image data to align the spout 89 or spout end 87 with the storage portion 93 or container perimeter 81 of the receiving vehicle by steering the propelled portion of the receiving vehicle to maintain the cooperative alignment for unloading or transferring material between the vehicles.

FIG. 3B provides a configuration in which the transferring vehicle and receiving vehicle operate in a leader-follower configuration with transferring vehicle in the lead role and the receiving vehicle in the following role, such that the receiving vehicle tracks or follows the heading and velocity (and optionally the acceleration) of the lead vehicle with a target spatial offset. In FIG. 3B, the image processing module 18 is only active on the transferring vehicle and is inactive or not present on the receiving vehicle. On the transferring vehicle, the imaging processing module 18 and first location determining receiver 42 provide image guidance data (if available or if reliable) and first motion data (e.g., location, heading, velocity and acceleration), respectively, that are used by both the transferring vehicle and the receiving vehicle for guidance.

In one configuration, the image guidance data, the first motion data, or both is transmitted by the first wireless communications device 48 on the transferring vehicle to the second wireless communications device 148 on the receiving vehicle. On the receiving vehicle, the slave controller 159 receives the first motion data from the first location determining receiver 42 on the transferring vehicle and second motion data from the second location determining receiver 142 on the receiving vehicle. The slave controller 159 generates an error or control data for controlling the steering system 30, braking system 34, and propulsion system 38 of the receiving vehicle, where the error or control data is based on the difference between the first motion data and the second motion data.

In another configuration, the master controller 59 on the transferring vehicle may send control signals or control data messages to the slave controller 159 on the receiving vehicle to control the steering system 30, braking system 34, or propulsion system 38 of the receiving vehicle to optimize the relative position of the spout end 87 to the storage portion 93 of the container, the target spatial separation between the vehicles, or to avoid an imminent collision between the vehicles. On the receiving vehicle, the slave controller 159 can operate in a slave mode or follower mode under the control of the master controller 59. The auto-guidance module 155 and the coordination module 157 within the slave controller 159 provide guidance of the receiving vehicle, consistent with location data and a path plan, or with other guidance data or command data from the transferring vehicle.

The second wireless communications device 148 is coupled to the vehicle data bus 60. In FIG. 3A or FIG. 3B, the system (311 or 411) for a receiving vehicle can be used in conjunction with the system (11 or 111) of the transferring vehicle of FIG. 1 or FIG. 2. The wireless devices (48, 148) may exchange or communicate position data, relative position data, command data, or control data for controlling, adjusting or coordinating the position and orientation of the vehicles; more particularly, the position and the orientation of the spout 89 or spout end 87 over the opening 83 of the container 85. The communicated data between the wireless communications devices (48, 148) may comprise any of the following data: (1) position data or location data from either location determining receiver (42 or 142), (2) command or guidance data from an image processing module 18 on the transferring vehicle or receiving vehicle, (3) command or guidance data from the master controller 59 or coordination module 47, (4) command or guidance data from the slave controller 159 or coordination module 157 or (5) alignment data (e.g., relative position of the imaging devices, relative position of reference points on the vehicles, and relative alignment between the spout and container perimeter) from the alignment module 24. For example, the imaging processing module 18 or alignment module 24 may use first location data of a first location determining receiver 42 and second location data of a second location determining receiver 142 to determine a relative position or spatial offset between the two vehicles (or a relative position) of the first imaging device 10 and the second imaging device 12 and to determine a relative alignment between the spout and the container perimeter.

The system 311 of FIG. 3A may support different configurations or combinations of electronic systems (e.g., 11 and 311, 111 and 311, 11 and 411, and 111 and 411) at the transferring and receiving vehicles. In a first configuration, an imaging device 10 on the receiving vehicle may be used instead of, or with, one or more imaging devices (10, 12) on the transferring vehicle. In a second configuration, the system 311 of FIG. 3A may provide collected image processing data from the receiving vehicle to the transferring vehicle via the transmission of the collected image processing data from the second wireless communications device 148 to the first wireless communications device 48. Here, in a second configuration, the collected imaging processing data from the receiving vehicle may be referred to as supplementary data, complementary image data, or additional image data. The additional image data may provide additional perspective or viewpoints that can supplement the image data collected by the transferring vehicle. For example, the additional image data may provide more accurate or supplement image data where the image data collected by the transferring vehicle is affected by moisture (e.g., on its lens), dust, poor ambient lighting, glare or reflections that do not similarly impair or impact the additional image data.

The optional odometry sensor 440 may be coupled to the vehicle data bus 60 or the implement data bus 58. The inertial sensor 442 may comprise one or more accelerometers, gyroscopes or other inertial devices coupled to the vehicle data bus 31 or the implement data bus 60.

The distributed fill state sensors 149 (e.g., in FIG. 3A and FIG. 3B) may comprise optical level sensors (not shown) distributed at different height levels within or around the container 85, piezoelectric mass sensors distributed to measure mass of the agricultural material in different volumes or on different floor areas (e.g., of a false vertically movable floor) of the container 85, or piezoresistive mass sensors distributed to measure mass of the agricultural material in different volumes or on different floor areas of the container 85, for example.

FIG. 4A illustrates a plan view of a transferring vehicle 91 and a receiving vehicle 79. As illustrated in FIG. 4A for explanatory purposes, the transferring vehicle 91 is shown as a combine with a harvesting head 185, whereas the receiving vehicle 79 is shown as a tractor and a grain cart. More generally, the receiving vehicle 79 comprises the combination of a propulsion unit 75 and a storage unit 93 (e.g., a towed storage unit).

FIG. 4A shows a first imaging device 10 on the transferring vehicle (e.g., combine) and an optional second imaging device 12 on a spout 89 of the transferring vehicle 91. The spout 89 may also be referred to as an unloading auger. The spout end 87 may be referred to as a boot. The first imaging device 10 has a first field of view 77, indicated by the dashed lines. The boundaries of the fields of view (77, 177) are merely shown for illustrative purposes and will vary in actual practice. The second imaging device 12 has a second field of view 177, indicated by the dashed lines. In FIG. 4A, the spout 89, or the spout end 87, is generally aligned over a central zone 83, central region or target area of the storage container 85 (of the receiving vehicle) for unloading material from the transferring vehicle to the receiving vehicle 79. Similarly, the transferring vehicle 91 and the receiving vehicle 79 are aligned in position as shown, regardless of whether the vehicles move together in a forward motion (e.g., with coordinated or tracked vehicle headings) during harvesting, as is typical, or are stationary. During unloading, the master controller 59 and slave controller 159 facilitate maintenance of a generally uniform spatial offset (e.g., a generally static offset that varies only within a target tolerance) between the vehicles (91, 79), subject to any incremental adjustment of the offset for uniform filling of the container 85. The master controller 59 and slave controller 159 support maintenance of a uniform fore/aft offset ($\Phi$ or $\phi$) and a lateral offset ($\Delta$).

In one embodiment the illustration in FIG. 4A, the second imaging device 12 may be mounted on the spout 89. The transferring vehicle 91 may be equipped with a spout angle sensor 116 (e.g., rotary position sensor) to measure the rotation angle of the spout. For a spout-mounted imaging device (e.g., second imaging device 12 on the spout as shown in FIG. 4A), the rotation angle of the spout 89 may be used to facilitate fusion of image data from the first imaging device 10 and the second imaging device 12, or to construct stereo image data where the first imaging device 10 and the second imaging device 12 individually provide monocular image data for the same scene or object.

In any arrangement of imaging devices (10, 12) disclosed herein where the fields of view (77, 177) overlap, data fusion of image data from a first imaging device 10 and a second imaging device 12 enables the image processing module 18 to create a virtual profile of the material distribution level inside the storage portion 85, even when the entire surface of the agricultural material is not visible to one of the two imaging devices (10, 12). Even if the second imaging device 12 is not mounted on the spout 89 in certain configurations, the spout angle sensor 116 may facilitate using the spout end 87 as a reference point in any collected image data (e.g., for fusion, virtual stitching or alignment of image data from different imaging devices.) The virtual profile of the entire surface of the agricultural material in the storage portion 93 enables the system (11, 111, 311) or imaging module 18 to intelligently execute a fill strategy for the storage portion 93 of the receiving vehicle.

Figure 4B:
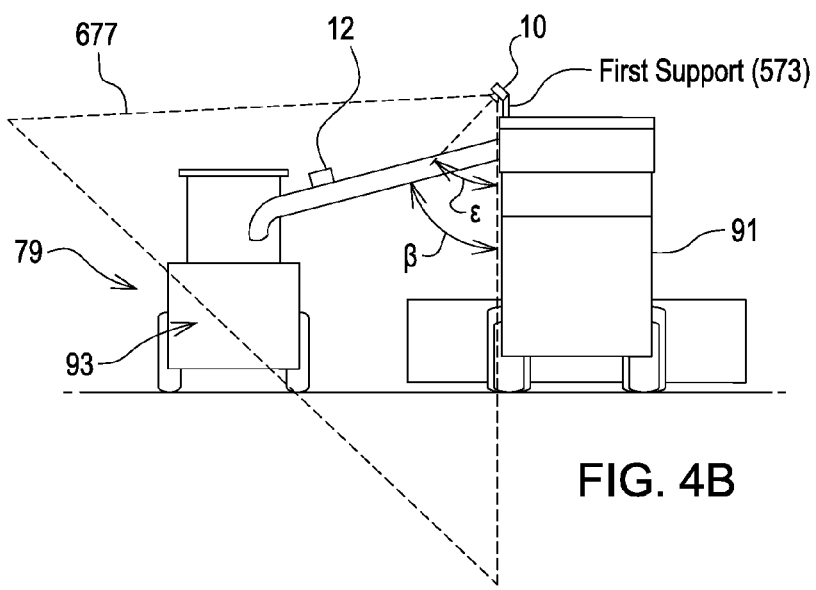
FIG. 4B illustrates a view in a horizontal plane as viewed along reference line 4B-4B in FIG. 4A.

In FIG. 4B, the first imaging device 10 and the second imaging device 12 are mounted on the transferring vehicle 91, where the first imaging device 10 is mounted on a first support 573 (e.g., monopole with tilt or pan adjustment) to provide a first downward field of view 677 or a down-tilted field of view.

If the first imaging device 10 is elevated or mounted on the transferring vehicle 91 sufficiently high with respect to the storage portion 93, the first imaging device 10 will have visibility or downward field of view 677 into the storage portion 93 or container 85 sufficient to observe and profile the surface (or height (z) versus respective x, y coordinates in the container) of the agricultural material (e.g., grain) as the agricultural material fills the storage portion 85. The first imaging device 10 may be mounted on the roof of the transferring vehicle 91 facing or looking directly away from the side of the transferring vehicle with the spout 89 for unloading agricultural material.

If the first imaging device 10 is further from the storage portion 93 or container 85 than the second imaging device 12 during unloading of the agricultural material, the first imaging device 10 can have suitable view of the storage portion 93 (e.g., grain cart) to facilitate easier tracking of the relative position of the storage portion 93 to the transferring vehicle 91.

In one illustrative configuration, consistent with the downward field of view (677) the optical axes, perpendicular to respective lens, of the first imaging device 10, the second imaging device 12, or both are tilted downward from generally horizontal plane at a down-tilted angle ($\epsilon$) (e.g., approximately 10 to 25 degrees downward). If a field of view or optical axis of the imaging device (10, 12) is tilted downward from a generally horizontal plane, there are several advantages. First, less of the sky is visible in the field of view of the imaging device (10, 12) such the collected image data tends to have a more uniform image intensity profile. The tilted configuration of the optical axis or axes (which are perpendicular to the lenses of the imaging devices (10, 12) is well suited for mitigating the potential dynamic range issues caused by bright sunlight or intermediate cloud cover, for instance. Second, the bottom part of the storage portion 93 becomes more visible in the image data to enable the recording of the image data related to one or more wheels of the storage portion 93. The wheel is a feature on the storage portion 93 that can be robustly tracked by image processing techniques. Third, tilting the stereo camera down may mitigate the accumulation of dust and other debris on the lens or external window of the imaging device (10, 12).

FIG. 5A illustrates a plan view of a transferring vehicle and a receiving vehicle. Like reference numbers indicate like elements in FIG. 5A and FIG. 4. FIG. 5A shows a first imaging device 10 on the rear of the propulsion unit 75 (e.g., tractor) or the receiving vehicle 79. The first imaging device 10 has a first field of view 277 indicated by the dashed lines. In FIG. 5A, the spout 89 or spout end 87 is generally aligned over a central zone 83, central region or target area of the storage unit 93 or container 85 for unloading material from the transferring vehicle 91 to the receiving vehicle 79. Similarly, the transferring vehicle 91 and the receiving vehicle 79 are aligned in position as shown, and even as the vehicles (79, 91) move with coordinated headings or generally parallel headings and with no or minimal relative velocity with respect to each other.

In FIG. 5A, an optional second imaging device 12 may be mounted on the vehicle with a second field of view 377, which may be slightly offset from, overlapped with, or aligned with the first field of view 277 to provide redundancy should the first imaging device 10 fail, malfunction, be unavailable, be unreliable, or provide poor quality image data. For example, the first imaging device 10 may not operate reliably where it is obscured by dust, fog, salt, or air-born contaminants, or where it is exposed to inadequate ambient light conditions or excessive glare from sunlight or reflected light. In FIG. 5A, the image processing module 18 can estimate the distance or range from the first imaging device 10, the second imaging device 12, or both to an object in the image, such as the spout 89, the spout end 87, the container perimeter 81, the level or profile of agricultural material in the container 85 (e.g., at various positions or coordinates within the container 85).

Figure 5B:
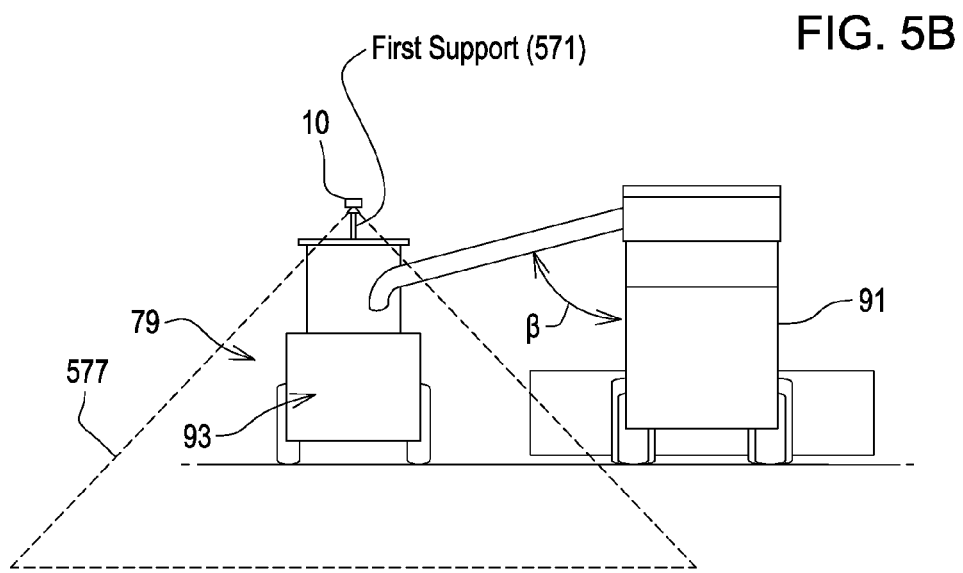
FIG. 5B illustrates a view in a horizontal plane as viewed along reference line 5B-5B in FIG. 5A.
Figure 5C:
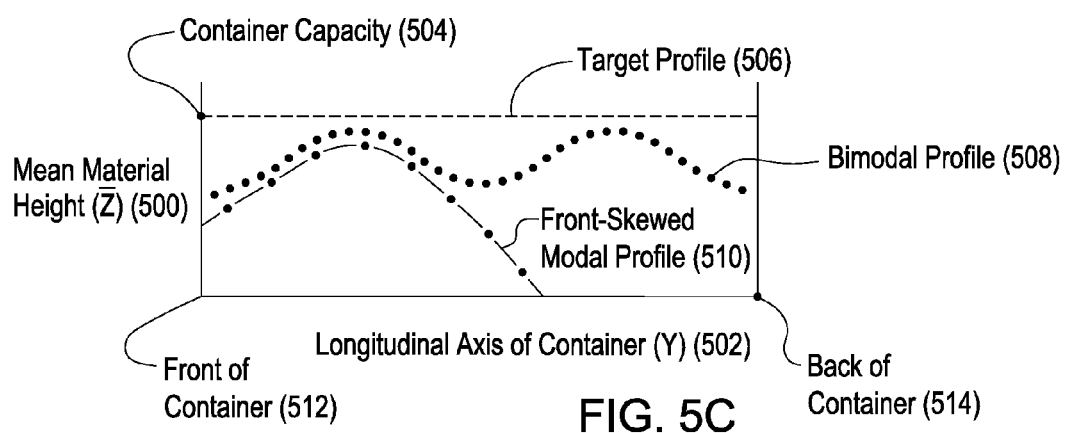
FIG. 5C illustrates a two-dimensional representation of various possible illustrative distributions of material in the interior of a container or storage portion, consistent with a cross-sectional view along reference line 5D-5D in FIG. 5B.

FIG. 5B illustrates a view in a horizontal plane as viewed along reference line 5B-5B in FIG. 5A. In one embodiment, the first imaging device 10 is mounted on the receiving vehicle 79 on a first support 571 (e.g., monopole with tilt or pan adjustment) to provide a first downward field of view 577 or a first down-tilted field of view.

In an alternate embodiment, the first support 571 comprises an adjustable mast or telescopic mast that is controlled by a mast controller (674) to remotely adjust the height, tilt angle, down-tilt angle, rotation angle, or pan angle to provide reliable image data for processing by the image processing module 18.

If the first imaging device 10 is elevated or mounted on the receiving vehicle 79 sufficiently high with respect to the storage portion 93, the first imaging device 10 will have visibility or first downward field of view 577 into the storage portion 93 or container 85 sufficient to observe and profile the surface (or height (z) versus respective x, y coordinates in the container) of the agricultural material (e.g., grain) as the agricultural material fills the storage portion 85. The first imaging device 10 may be mounted on the roof or cab of the receiving vehicle 79 (or its propulsion unit 75) facing or looking directly away from the side of the transferring vehicle with the spout 89 for unloading agricultural material.

In one illustrative configuration, consistent with the downward field of view 577 the optical axes, perpendicular to respective lens, of the first imaging device 10 is tilted downward from generally horizontal plane at a down-tilted angle (e.g., approximately 10 to 25 degrees downward). If a field of view or optical axis of the imaging device 10 is tilted downward from a generally horizontal plane, there are several advantages. First, less of the sky is visible in the field of view of the imaging device 10 such the collected image data tends to have a more uniform image intensity profile. The tilted configuration of the optical axis (which are perpendicular to the lenses of the imaging devices 10 is well suited for mitigating the potential dynamic range issues caused by bright sunlight or intermediate cloud cover, for instance. Second, the bottom part of the storage portion 93 becomes more visible in the image data to enable the recording of the image data related to one or more wheels of the storage portion 93. The wheel is a feature on the storage portion 93 that can be robustly tracked by image processing techniques. Third, tilting the stereo camera down may mitigate the accumulation of dust and other debris on the lens or external window of the imaging device 10.

FIG. 5C illustrates a two-dimensional representation of various possible illustrative distributions of material in the container 85, consistent with a view along reference line 5C-5C in FIG. 5A. In one configuration, the y axis is coincident with the longitudinal axis or direction of travel of the container, the z axis is coincident with the height of material in the container, and the x axis is perpendicular to the direction of travel of the container, where the x, y and z axes are generally mutually orthogonal to each other.

In the chart of FIG. 5C, the vertical axis is the mean height (z̄) 500 of the material in the container 85; the horizontal axis represents the longitudinal axis (y) 502 of the container 85. The maximum capacity 504 or container capacity is indicated by the dashed line on the vertical axis. The front 512 of the container 85 is located at the origin, whereas the back 514 of the container 85 is located on the vertical axis.

FIG. 5C shows three illustrative distributions of material within the container 85. The first distribution is a bimodal profile 508 in which there are two main peaks in the distribution of material in the container 85. The bimodal profile 508 is shown as a dotted line. The bimodal profile 508 can occur where the spout angle adjustment is governed by an electrohydraulic system with non-proportional valves.

The second distribution is the front-skewed modal profile 510 in which there is single peak of material toward the front of the container 85. The front-skewed modal profile 510 is shown as alternating long and short dashes. The second distribution may occur where the volume or length (y) of the container 85 is greater than a minimum threshold and where the relative alignment between the spout end 87 and the container 85 is generally stationary during a substantial portion of unloading of the material.

The third distribution is the target profile 508 which may be achieved by following a suitable fill strategy as disclosed in this document. For example, during unloading, the spout angle may be adjusted to promote uniform distribution of the agricultural material in the container 85. Further, the lateral offset ($\Delta$) or fore/aft offset ($\Phi$ or $\phi$) between the vehicles (79, 91) may be adjusted in accordance with a matrix (e.g., x, y coordinate matrix of equidistant point locations of the transferring vehicle relative to a constantly spaced position point of the receiving vehicle) of relative unloading positions, particularly for longer or wider containers that cannot be uniformly filled from a single, relative unloading point between the vehicles (79, 91).

Figure 5D:
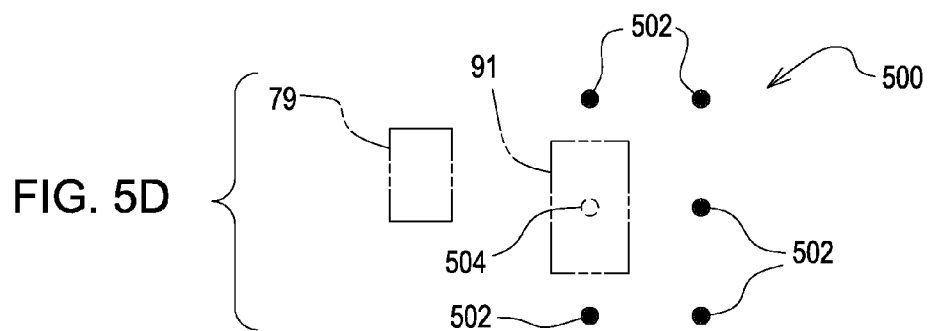
FIG. 5D is a plan view of a transferring vehicle and a receiving vehicle, where the transferring vehicle is aligned within a matrix of possible offset positions.

FIG. 5D is a plan view of a transferring vehicle 91 and a receiving vehicle 79, where the transferring vehicle 91 is aligned within a matrix 500 of possible offset positions (502, 504) between the transferring and receiving vehicle 79. Each offset position (502, 504) may be defined in terms of a combination of a unique lateral offset ($\Delta$) and a unique fore/aft offset ($\Phi$ or $\phi$) between the vehicles (79, 91). As shown, the matrix 500 is a two-dimensional, 2×3 (2 columns by 3 rows) matrix of possible offset positions (502, 504). Although six possible matrix positions (502, 504) are shown, in alternate embodiments the matrix 500 may consistent of any number of possible offset positions greater than or equal to two. Here, the transferring vehicle 91 occupies a current offset position 504 in the first column at the second row of the matrix 500, whereas the other possible offset positions 502 are not occupied by the transferring vehicle 91. As directed by any of the systems (11, 111, 311), the imaging processing module 18, or the master controller 59 of the transferring vehicle 91 can shift to any unoccupied or other possible offset positions 502 within the matrix 500 to promote or facilitate an even distribution of agricultural material within the container 85 or storage portion of the receiving vehicle 79. The spatial offset between the transferring vehicle 91 and the receiving vehicle 79 may be adjusted in accordance with the matrix 500 or another matrix of preset positions of spatial offset to promote even distribution of agricultural material in the storage portion of the receiving vehicle 79, where any matrix is associated with a unique, relative lateral offset ($\Delta$) and fore/aft offset ($\Phi$ or $\phi$) between the vehicles (79, 91).

In one embodiment of FIG. 5D, both the transferring vehicle 91 and the receiving vehicle 79 may be moving forward at approximately the same velocity and heading (e.g., within a tolerance or error of the control systems during harvesting), where the relative position of the receiving vehicle 79 is generally fixed or constant with respect to each position (502, 504) in the matrix 500 that the transferring vehicle 91 can occupy.

In an alternate embodiment, the receiving vehicle 79 may be shown as occupying a two dimensional matrix (e.g., 3×3 matrix, with three columns and three rows) of possible offset positions, while the position of the transferring vehicle 91 is generally fixed or constant with respect to each position of matrix that the receiving vehicle 79 could occupy. As directed by any of the systems (11, 111, 311) in the alternate embodiment, the imaging processing module 18, or the master controller 159 of the receiving vehicle 79 can shift to any unoccupied or other possible offset positions within the matrix to promote or facilitate an even distribution of agricultural material within the container 85 or storage portion of the receiving vehicle 79.

Figure 6:
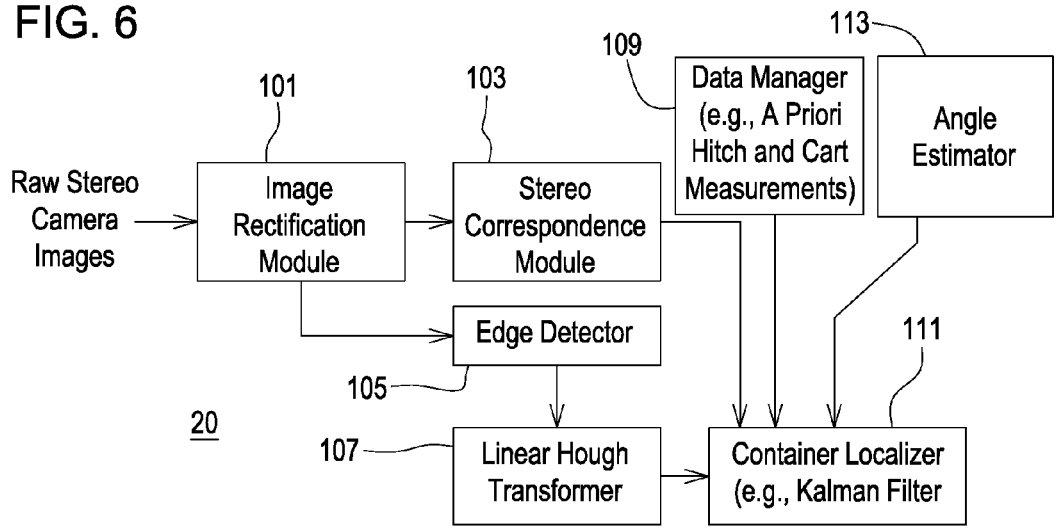
FIG. 6 illustrates a block diagram of a container module or an image processing module.
Figure 7A:
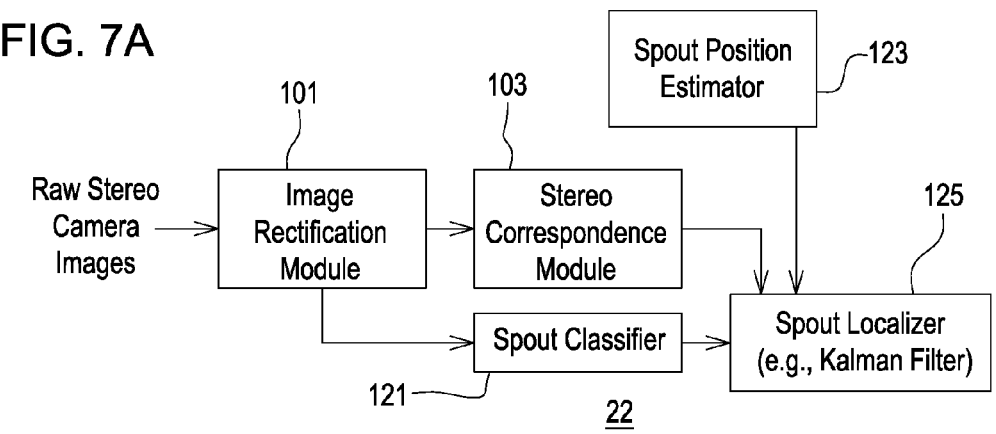
FIG. 7A is a block diagram of one embodiment of a spout module or an image processing module.
Figure 7B:
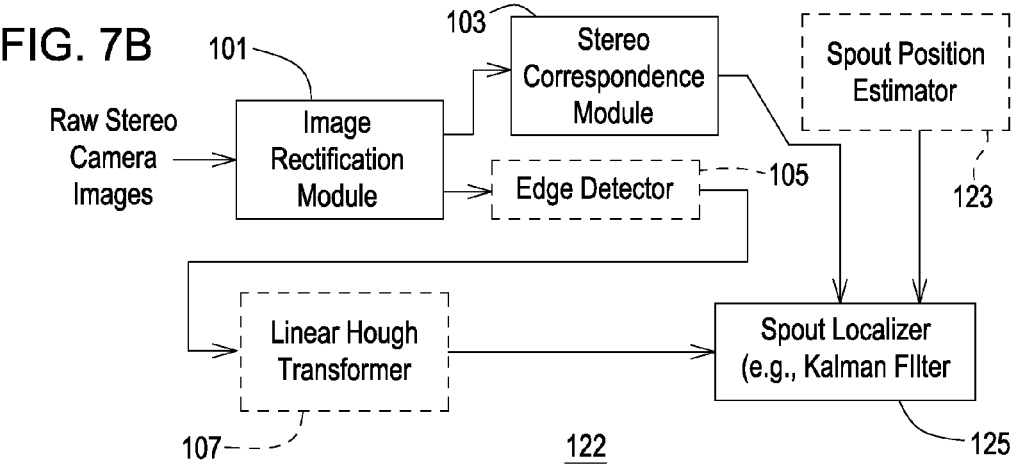
FIG. 7B is a block diagram of an alternate embodiment of a spout module or an image processing module.

In FIG. 6, FIG. 7A and FIG. 7B, each of the blocks or modules may represent software modules, electronic modules, or both. Software modules may contain software instructions, subroutines, object-oriented code, or other software content. The arrows that interconnect the blocks or modules of FIG. 6 show the flow of data or information between the blocks. The arrows may represent physical communication paths or virtual communication paths, or both. Physical communication paths mean transmission lines or one or more data buses for transmitting, receiving or communicating data. Virtual communication paths mean communication of data, software or data messages between modules.

FIG. 6 is a block diagram that shows the imaging processing module 18 and the container module 20 in greater detail than FIG. 1. Like reference numbers in FIG. 1, FIG. 6, FIG. 7A, and FIG. 7B indicate like elements. As illustrated in FIG. 6, the first imaging device 10, the second imaging devices 12, or both, provide input of raw stereo camera images (or raw image data) to the image rectification module 101. In turn, the image rectification module 101 communicates with the stereo correspondence module 103 and the edge detector 105. The edge detector 105 provides an output to the linear Hough transformer 107. The outputs of the stereo correspondence module 103 and the linear Hough transformer 107 are provided to the container localizer 111. The container localizer 111 may access or receive stored (a priori) hitch and container measurements, container dimensions, container volume or other receiving vehicle data from the data manager 109. In one embodiment, the container localizer 111 may receive or access and an estimate of the tongue angle (between the propulsion portion 75 and the storage portion 93 of the receiving vehicle 79) from the angle estimator 113 and stored hitch and container measurements.

Although the image rectification module 101 is shown as part of the container module 20, in an alternate embodiment, the image rectification module 101 or image rectifier may be incorporated into the first imaging device 10, the second imaging device 12, or both. In the another embodiment, the image rectification module 101 (in the image processing module 18 or in the imaging device (10, 12)) provides image processing to the collected image data or raw stereo images to reduce or remove radial lens distortion and image alignment required for stereo correspondence. The radial lens distortion is associated with the radial lenses of the first imaging device 10, the second imaging device 12, or both. The input of the image rectification module 101 is raw stereo image data, whereas the output of the image rectification module 101 is rectified stereo image data.

In one illustrative embodiment, the image rectification module 101 eliminates or reduces any vertical offset or differential between a pair of stereo images of the same scene of the image data. Further, the image rectification module can align the horizontal component (or horizontal lines of pixels of the stereo images) to be parallel to the scan lines or common reference axis of each imaging device (e.g., left and right imaging device) within the first and second imaging devices (10, 12). For example, the image rectification module can remap pixels from initial coordinates to revised coordinates for the right image, left image or both to achieve registration of the images or rectified right and left images of the stereo image. The rectified image supports efficient processing and ready identification of corresponding pixels or objects within the image in the left image and right image of a common scene for subsequent image processing (e.g., by the stereo corresponding module 103).

In one configuration, the stereo correspondence module 103 applies a stereo matching algorithm or disparity calculator to collected stereo image data, such as the rectified stereo image data outputted by the image rectification module 101. The stereo matching algorithm or disparity calculator may comprise a sum of absolute differences algorithm, a sum of squared differences algorithm, a consensus algorithm, or another algorithm to determine the difference or disparity for each set of corresponding pixels in the right and left image (e.g., along a horizontal axis of the images or parallel thereto).

In an illustrative sum of the absolute differences procedure, the right and left images (or blocks of image data or rows in image data) can be shifted to align corresponding pixels in the right and left image. The stereo matching algorithm or disparity calculator determines a disparity value between corresponding pixels in the left and right images of the image data. For instance, to estimate the disparity value, each first pixel intensity value of a first subject pixel and a first sum of the first surrounding pixel intensity values (e.g., in a block or matrix of pixels) around the first pixel is compared to each corresponding second pixel intensity value of second subject pixel and a second sum of the second surrounding pixel intensity values (e.g., in a block or matrix of pixels) around the second pixel. The disparity values can be used to form a disparity map or image for the corresponding right and left image data.

The image processing module 18, or container localizer 111, estimate a distance or range from the first imaging device 10, the second imaging device 12, or both to the pixels or points lying on the container perimeter 81, on the container edge 181, on the spout 89, on the spout end 87, or on any other linear edge, curve, ellipse, circle or object identified by the edge detector 105, the linear Hough transformer 107, or both. For example, the image processing module 18 may use the disparity map or image to estimate a distance or range from the first imaging device 10, the second imaging device 12, or both to the pixels or points lying on the container perimeter 81, the container edges 181, the container opening 83, in the vicinity of any of the foregoing items, or elsewhere.

Although the stereo correspondence module 103 is illustrated as part of the container module 20, in an alternate embodiment the stereo correspondence module 103 may comprise a separate module within the image processing system 18 or a disparity module, for example.

In one embodiment, the container module 20 comprises: (1) an edge detector 105 for measuring the strength or reliability of one or more edges 181, or points on the container perimeter 81 in the image data; (2) a linear Hough transformer 107 for identifying an angle and offset of candidate linear segments in the image data with respect to a reference point on an optical axis, reference axis of the one or more imaging devices (10, 12); (3) a container localizer 111 adapted to use spatial and angular constraints to eliminate candidate linear segments that cannot logically or possibly form part of the identified linear segments of the container perimeter 81, or points on the container perimeter 81; and (4) the container localizer 111 transforms the non-eliminated, identified linear segments, or identified points, into two or three dimensional coordinates relative to a reference point or reference frame of the receiving vehicle and harvesting vehicle.

The edge detector 105 may apply an edge detection algorithm to rectified image data from the image rectification module 101. Any number of suitable edge detection algorithms can be used by the edge detector 105. Edge detection refers to the process of identifying and locating discontinuities between pixels in an image or collected image data. For example, the discontinuities may represent material changes in pixel intensity or pixel color which defines boundaries of objects in an image. A gradient technique of edge detection may be implemented by filtering image data to return different pixel values in first regions of greater discontinuities or gradients than in second regions with lesser discontinuities or gradients. For example, the gradient technique detects the edges of an object by estimating the maximum and minimum of the first derivative of the pixel intensity of the image data. The Laplacian technique detects the edges of an object in an image by searching for zero crossings in the second derivative of the pixel intensity image. Further examples of suitable edge detection algorithms include, but are not limited to, Roberts, Sobel, and Canny, as are known to those of ordinary skill in the art. The edge detector 105 may provide a numerical output, signal output, or symbol, indicative of the strength or reliability of the edges 181 in field. For example, the edge detector may provide a numerical value or edge strength indicator within a range or scale or relative strength or reliability to the linear Hough transformer 107.

The linear Hough transformer 107 receives edge data (e.g., an edge strength indicator) related to the receiving vehicle and identifies the estimated angle and offset of the strong line segments, curved segments or generally linear edges (e.g., of the container 85, the spout 89, the spout end 87 and opening 83) in the image data. The estimated angle is associated with the angle or compound angle (e.g., multidimensional angle) from a linear axis that intercepts the lenses of the first imaging device 10, the second image device 12, or both. The linear Hough transformer 107 comprises a feature extractor for identifying line segments of objects with certain shapes from the image data. For example, the linear Hough transformer 107 identifies line equation parameters or ellipse equation parameters of objects in the image data from the edge data outputted by the edge detector 105, or Hough transformer 107 classifies the edge data as a line segment, an ellipse, or a circle. Thus, it is possible to detect containers or spouts with generally linear, rectangular, elliptical or circular features.

In one embodiment, the data manager 109 supports entry or selection of container reference data by the user interface 44. The data manager 109 supports entry, retrieval, and storage of container reference data, such as measurements of cart dimensions, by the image processing module 18 to give spatial constraints to the container localizer 111 on the line segments or data points that are potential edges 181 of the cart opening 83.

In one embodiment, the angle estimator 113 estimates the angle of the storage portion 93 (e.g., cart) of the receiving vehicle 79 to the axis of the direction of travel of the propelled portion 75 (e.g., tractor) of the receiving vehicle 79. The angle estimator 113 provides angular constraints to the container localizer 111 on the lines, or data points, that are potential edges 181 of the container opening 83. In configuration, the angle estimator 113 is coupled to the localizer 111 (e.g., container localizer or Kalman filter). The angle estimator filter 113 outputs, or is capable of providing, the received estimated angle of the storage portion 93 relative to the axis of the direction of travel of the propelling portion 75 of the vehicle.

The localizer 111 is adapted to receive measurements of dimensions of the container perimeter 81 or the storage portion 93 of the vehicle to facilitate identification of candidate linear segments that qualify as identified linear segments of the container perimeter 81. In one embodiment, the localizer 111 is adapted to receive an estimated angle of the storage portion 93 relative to the propelling portion 75 of the vehicle to facilitate identification of candidate linear segments that qualify as identified linear segments of the container perimeter 81. The localizer 111 uses spatial and angular constraints to eliminate candidate lines in the image data that cannot be possibly or logically part of the container opening 83 or container edges 181, then selects preferential lines (or data points on the container edge 81) as the most likely candidates for valid container opening 83 (material therein) or container edges 181. The localizer 111 characterizes the preferential lines as, or transformed them into, three dimensional coordinates relative to the vehicle or another frame of reference to represent a container perimeter of the container 85.

FIG. 7A is a block diagram that shows the image processing module 18 and the spout module 22 in greater detail than FIG. 1. Like reference numbers in FIG. 1, FIG. 6, FIG. 7A, FIG. 7B indicate like elements. In FIG. 7A, the image rectification module 101 communicates with the stereo correspondence module 103 and the spout classifier 121. In turn, the spout classifier 121 provides an output to the spout localizer 125. The spout localizer 125 accesses or receives the spout position from angle sensor 115 or the spout position estimator 123 (or spout angle ($\alpha$) with respect to the transferring vehicle direction of travel or vehicle reference frame), stereo correspondence data from the stereo correspondence module 103, and the output data from the spout classifier 121.

Although the image rectification module 101 is shown as part of the spout module 22, in an alternate embodiment, the image rectification module 101 or image rectifier may be incorporated into the first imaging device 10, the second imaging device 12, or both.

Although the stereo correspondence module 103 is illustrated as part of the spout module 22, in an alternate embodiment the stereo correspondence module 103 may comprise a separate module within the image processing system 18 or a disparity module, for example.

In one embodiment, the spout module 22 comprises a spout classifier 121 that is configured to identify candidate pixels in the image data based at least one of reflectivity, intensity, color or texture features of the image data (or pixels), of the rectified image data or raw image data, where the candidate pixels represent a portion of the spout 89 or spout end 87.

In one configuration, the spout localizer 125 is adapted to estimate a relative position of the spout 89 to the imaging device based on the classified, identified candidate pixels of a portion of the spout 89 or other image processing of the image processing module 18. In another configuration, the spout localizer 125 estimates a relative position of the spout 89 or the spout end 87 based on the following: (1)(a) rotation angle data from the rotation sensor (216 or 266), or (1)(b) a combination of a rotation angle or spout angle ($\alpha$) from the rotation angle (216 or 266) and a tilt angle from a tilt sensor 268, and (2) a length of the spout 89 from the rotational axis about which the spout 89 rotates. The spout localizer 125 can estimate a combine spout position of the spout end 87 or spout angle ($\alpha$) relative to the mounting location of the imaging device, or optical axis, or reference axis of one or more imaging devices, based on previous measurements to provide constraint data on where the spout 89 can be located possibly.

The spout classifier 121 applies or includes software instructions on an algorithm that identifies candidate pixels that are likely part of the spout 89 or spout end 87 based on expected color and texture features within the processed or raw image data. For example, in one configuration the spout end 87 may be painted, coated, labeled or marked with a coating or pattern of greater optical or infra-red reflectivity, intensity, or luminance than a remaining portion of the spout 89 or the transferring vehicle. The greater luminance, intensity or reflectivity of the spout end 87 (or associated spout pixels of the image data versus background pixels) may be attained by painting or coating the spout end 87 with white, yellow, chrome or a lighter hue or shade with respect to the remainder of the spout 89 or portions of the transferring vehicle (within the field of view of the imaging devices (10, 12).

In one embodiment, the spout position estimator 123 receives input of previous measurements and container reference data and outputs an estimate of the spout position, spout angle, or its associated error. The spout position estimator 123 provides an estimate of the combine spout position, or spout angle, or its error, relative to one or more of the following: (1) the mounting location or pivot point of the spout on the transferring vehicle, or (2) the optical axis or other reference axis or point of the first imaging device 10, the second imaging device 12, or both, or (3) the axis associated with the forward direction of travel or the heading of the transferring vehicle. In one embodiment, the spout position estimator 123 is coupled to the spout localizer 125.

In one embodiment, the spout localizer 125 comprises a Kalman filter. The Kalman filter outputs constraints on where the spout 89 or spout end 87 can be located, an estimated spout position, or a spout location zone or estimated spout position zone. The spout localizer 125 takes pixels that are classified as belonging to the combine auger spout 89 and uses a disparity image (from stereo correspondence data) to estimate the relative location of the spout to the first imaging device 10, the second imaging device 12, or both, or reference axis or coordinate system associated with the vehicle.

FIG. 7B illustrates an alternative configuration of the spout module 122. Spout module 122 is similar to spout module 22 of FIG. 7A, except spout module 22 incorporates some components or blocks that are similar to those in FIG. 6. Like reference numbers indicate like elements in FIG. 1, FIG. 6, FIG. 7A, and FIG. 7B. In FIG. 3A, the spout module 122 of FIG. 7B may be in place of the spout module 22, where the system 311 is mounted on a receiving vehicle, unless the transferring vehicle has a rotation sensor for the spout and transmits the spout rotation angle to the system 311 for processing.

In FIG. 7B, an optional edge detector 105 and an optional linear Hough transformer 107 are shown in dashed lines. The optional edge detector 105 is coupled to the linear Hough transformer 107. In turn, the linear Hough transformer 107 is coupled to the spout localizer 125. The edge detector 105 and the linear Hough transformer 107 function as described above in conjunction with the container module 20 of FIG. 20, except that the processed image data relates to the position or coordinates of the spout 89 and the spout end 87, as opposed to the position of the storage container 93 or its container perimeter 81.

In one embodiment, the edge detector 105, alone or in combination with the Hough transformer 107, detects an edge of the spout 89, or an edge the spout end 87. For example, the detection of the edge of a spout 89 in image data and its corresponding coordinates (e.g., in three dimensions) may provide an indication of the spout angle or rotation angle of the spout, or the orientation of the spout end 87 with respect to the transferring vehicle, or a reference point thereon. The spout module 122 of FIG. 7B can provide the spout angle, a position of the spout 89, or a position (e.g., three dimensional coordinates) of the spout end 87 without any sensor data from the rotation sensor 216 or the rotation sensor 266, although sensor data from any rotation sensor, tilt sensor or deflector sensor associated with the spout may be used to restrict the data for image processing within the collected image data to certain zones or quadrants of interest to more efficiently process the image data.

Figure 8:
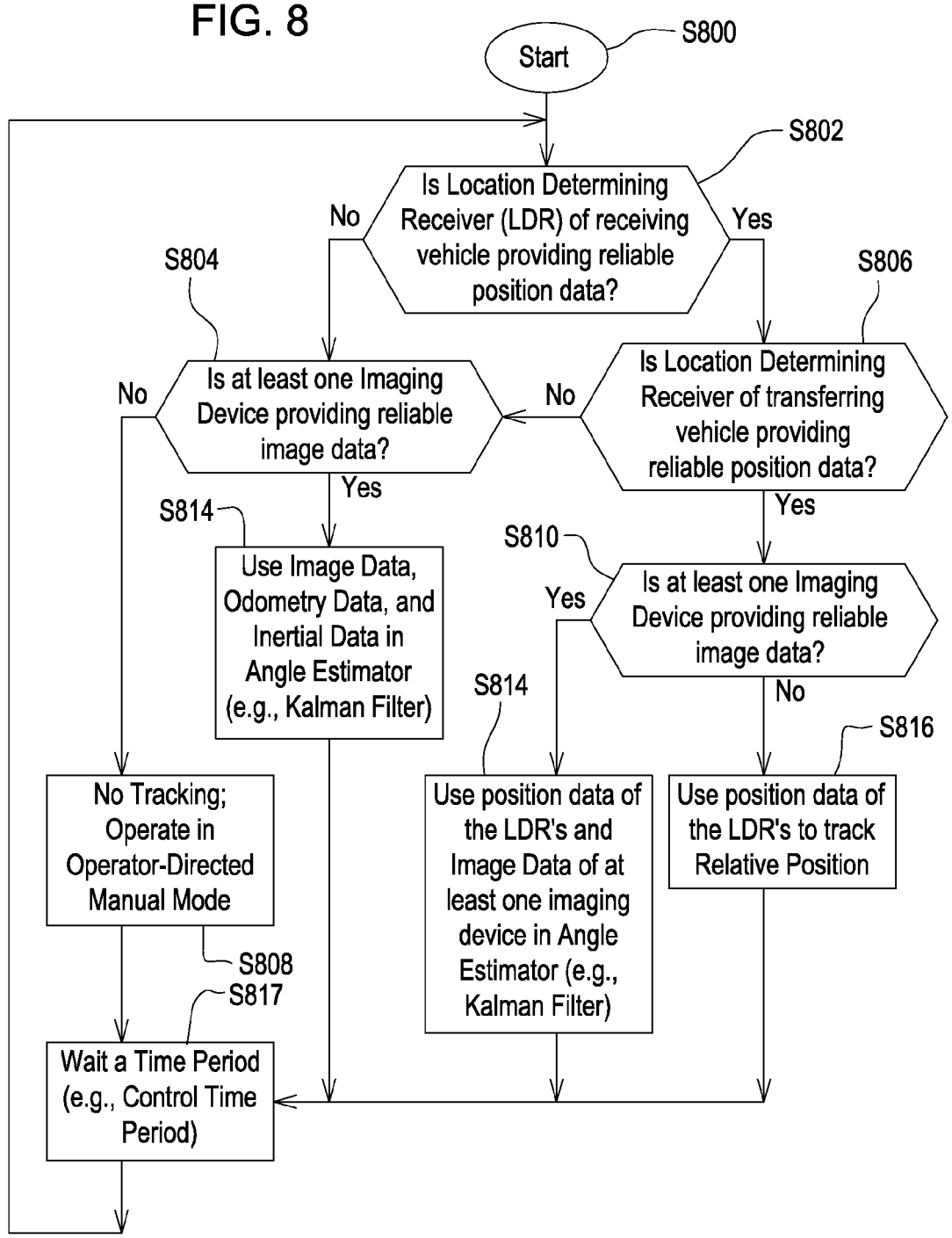
FIG. 8 is a flow chart of a method for operating a mode controller of a machine vision-augmented guidance system for facilitating the unloading of agricultural material from a vehicle (e.g., combine).

The flow chart of FIG. 8 begins in block S800. In block S800, the process starts. In block S802, the mode controller 225 or system (11, 111, 311) decides if the second location determining receiver 142 of the receiving vehicle provides reliable position data during an evaluation time period. In block S802, the determination of reliable position data or acceptable position data may be carried out by the following techniques that may be applied separately or cumulatively. Under a first technique of executing step S802, the second location determining receiver 142 provides reliable position data or acceptable position data if the dilution of precision or total equivalent user range error is less than a threshold level during a sampling period.

Under a second technique of executing step S802, the location determining receiver 142 is assumed to provide reliable position data or acceptable position data, unless the receiver provides an error code, a diagnostic code, a fault code, or an alarm.

Under a third technique, the second location determining receiver 142 provides reliable position data or acceptable position data, unless it fails to output location data on a certain monitored data port, or fails to provide accurate or reliable location data on a certain monitored data port consistent with alignment with a known position landmark or reference position in a work area or field. Under the third technique, the transferring vehicle, receiving vehicle or both are aligned with the known position landmark or reference position on a regular or periodic basis (e.g., at start of harvesting or at the beginning of an agricultural task) to check for reliable performance of the location determining receivers (42, 142).

If the second location determining receiver 142 provides reliable position data during the evaluation time period, the method continues with block S806. However, if the second location determining receiver 142 does not provide reliable position data during the evaluation time period, then the method continues with block S804.

In block S804, the image processing module 18, the arbiter 25, the mode controller 225, or the system (11, 111, 311) decides if at least one imaging device (e.g., 10, 12, stereo vision imaging device or a pair of monocular imaging devices) is providing reliable image data. In one example, the imaging device provides reliable or acceptable image data in which the container module 20 or spout module 22 (e.g., or the respective edge detection modules therein) are capable of one or more of the following: (1) reliably identifying or resolving one or more edges of spout 89 or container perimeter 81 in the collected image data during a sampling time period, or (2) reliably identifying on a time percentage basis (e.g., at least 99.99% of the time) one or more reference objects (e.g., a reference pattern or reference image on the spout or receiving vehicle) or objects in the image data. If the imaging device (10, 12) is providing reliable image data, then the method continues with block S812. However, if the imaging device (10, 12) is not providing reliable image data, then the method continues with block S808.

In block S806, the mode controller 225 or the system (11, 111, 311) decides if the first location determining receiver 42 of the transferring vehicle is providing reliable position data. In block S806, the determination of reliable position data or acceptable position data may be carried out by the following techniques that may be applied separately or cumulatively. Under a first technique of executing step S802, the first location determining receiver 42 provides reliable position data or acceptable position data if the dilution of precision or total equivalent user range error is less than a threshold level during a sampling period.

Under a second technique of executing step S802, the first location determining receiver 42 is assumed to provide reliable position data or acceptable position data, unless the receiver provides an error code, a diagnostic code, a fault code, or an alarm.

Under a third technique, the first location determining receiver 42 provides reliable position data or acceptable position data, unless it fails to output location data on a certain monitored data port, or fails to provide accurate or reliable location data on a certain monitored data port consistent with alignment with a known position landmark or reference position in a work area or field. Under the third technique, the transferring vehicle, receiving vehicle or both are aligned with the known position landmark or reference position on a regular or periodic basis (e.g., at start of harvesting or at the beginning of an agricultural task) to check for reliable performance of the location determining receivers (42, 142).

If the first location determining receiver 42 of the transferring vehicle is providing reliable position data, the method continues with step S810. However, if the first location-determining receiver 42 is not providing reliable position data, the method continues with or returns to block S804.

In block S808, the image processing module 18, the arbiter 25, or the mode controller 225 determines that the system (11, 111, 311) does not provide reliable tracking data for automated guidance and alignment of the spout 89 and the container 85 of the receiving portion 93. Accordingly, the image processing system 18, arbiter 25, or mode controller 225 determines that the system (11, 111, 311) shall operate in an operator-directed manual mode for a control time period following the evaluation time period.

In block S810, the image processing module 18, the arbiter 25, or the mode controller 225 decides if at least one imaging device (e.g., 10, 12, stereo vision imaging device or a pair of monocular imaging devices) is providing reliable image data. In one example, the imaging device (10, 12) provides reliable or acceptable image data in which the container module 20 or spout module 22 (e.g., or the respective edge detection modules therein) are capable of any of the following: (1) reliably identifying or resolving one or more edges of spout 89 or container perimeter 81 in the collected image data during a sampling time period, or (2) reliably identifying on a time percentage basis (e.g., at least 99.99% of the time) one or more reference objects (e.g., a reference pattern or reference image on the spout 89 or receiving vehicle 91) or objects in the image data. If the imaging device (10, 12) is providing reliable image data, then the method continues with block S814. However, if the imaging device is not providing reliable image data, then the method continues with block S816.

In block S812, the image processing module 18, mode controller 225, or system (11, 111, 311) operates in the manual mode or a partially automated mode. In the partially automated mode, an operator may be present in the vehicles for overriding, supplementing or correcting the guidance or alignment data providing by the imaging device (10,12) tracking, the odometry data (via odometry sensor 440), inertial data (via inertial sensor 442) and the angle estimator 113. For example, in step S812 the imaging processing module 18 or mode controller 225 uses camera tracking, odometry data, and the angle estimator 113 (e.g., Kalman filter). The angle estimator 113 can be used to estimate an angle between a propulsion unit and a container of the receiving vehicle.

In block S814, the image processing module 18, mode controller 225, or system (11, 111, 311) operates in the automated mode. For example, the imaging processing module 18 or mode controller 225 uses position data of the location determining receivers (42, 142), tracking data of at least one imaging device (10, 12), and the angle estimator 113 (e.g., Kalman filter). The angle estimator 113 can be used to estimate an angle between a propulsion portion 75 and a storage portion 93 of the receiving vehicle.

In block S816, the imaging processing module 18, mode controller 225, or system operates in a manual mode or partially automated mode. In the partially automated mode, one or more operators may be present in the vehicles (79, 91) for overriding, supplementing or correcting the guidance or alignment data providing by the location determining receivers (42, 142). For example, the imaging processing module 18 uses position data of the location determining receivers (42, 142) to guide the vehicles or to align the spout and the container.

After block S808, S812, S814 or S816, the method of FIG. 8 may continue with block S817. In block S817, the image processing module 18, mode controller 225, or system may wait a time period (e.g., a control time period or an evaluation time period) prior to looping or returning to step S802.

Figure 9:
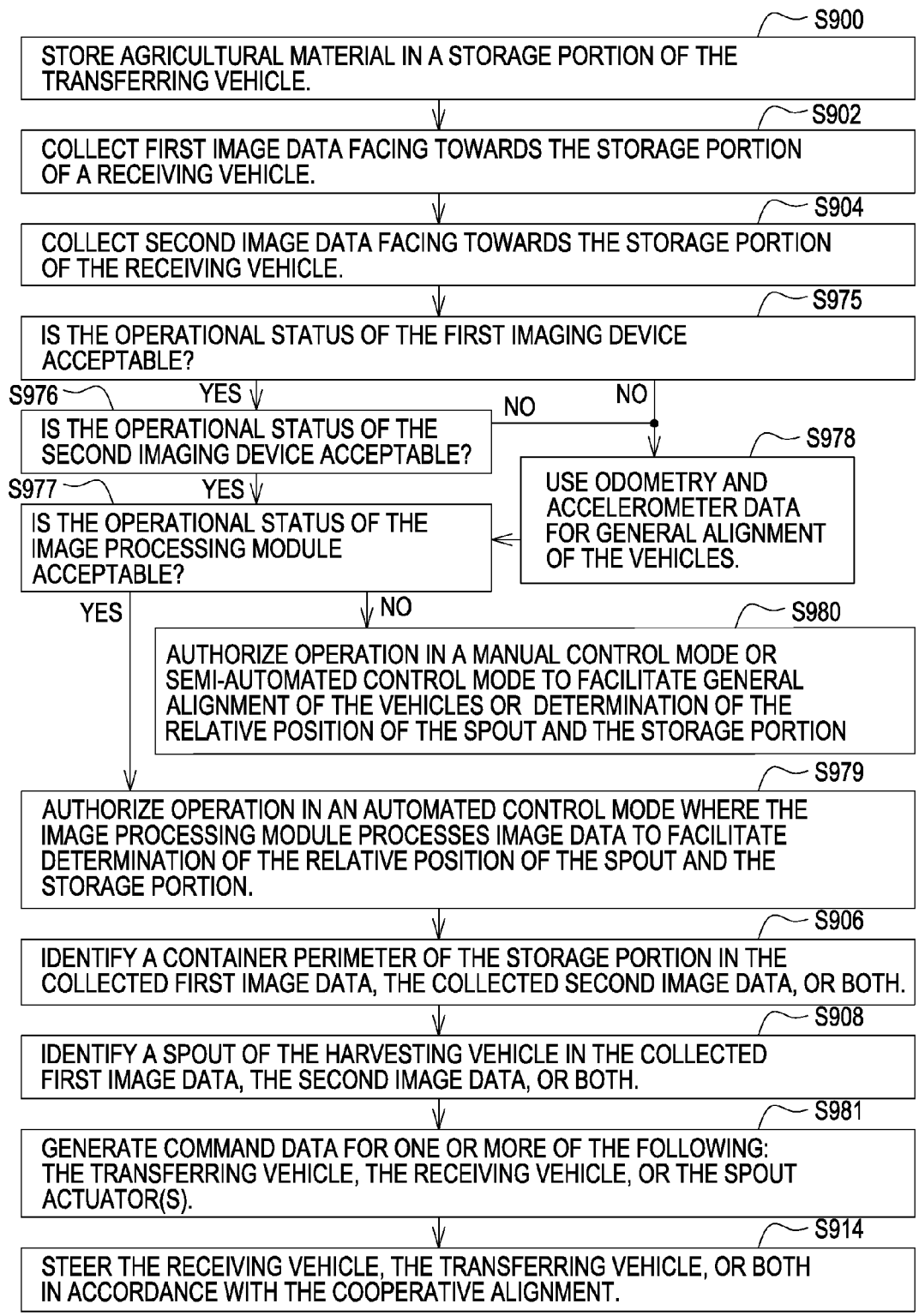
FIG. 9 is a flow chart of yet another method for a machine vision-augmented guidance system for facilitating the unloading of agricultural material from a vehicle (e.g., combine).

FIG. 9 is a flow chart of a method for facilitating the unloading of agricultural material from a vehicle or between a transferring vehicle 91 and a receiving vehicle 79. The method of FIG. 9 begins in step S900 and may use one or more of the following embodiments of the systems (11, 111, or 311) previously disclosed herein.

In step S900, the transferring vehicle 91 (e.g., harvester or combine) stores agricultural material in a storage portion (e.g., grain bin) of the transferring vehicle 91. For example, the transferring vehicle may store the agricultural material in the storage portion of the transferring vehicle 91 as the transferring vehicle 91 moves forward and harvests crop in a field. As the storage portion or storage vessel (e.g., grain tank) of the transferring vehicle 91 becomes full or near capacity, the receiving vehicle may move along one side of the moving transferring vehicle 91 for unloading of the agricultural material (e.g., consistent with or similar to the illustration of FIG. 4A).

In step S902, the first imaging device 10 faces toward the storage portion of the receiving vehicle 79 (e.g., grain cart) and collects first image data (e.g., first stereo image data, first monocular image data, or a right image of a stereo image). For example, the first imaging device 10 may be mounted on the transferring vehicle 91 facing the receiving vehicle 79 facing the container 85. In one embodiment, the first imaging device 10 has first field of view (77 in FIG. 4A) of the storage portion of the receiving vehicle 79.

In an alternative embodiment, the first imaging device 10 comprises a monocular imaging device that provides a first image section (e.g., left image) of stereo image data of a scene or an object.

In step S904, where present, the optional second imaging device 12 faces toward the storage portion 93 of the receiving vehicle 79 (e.g., grain cart) and collects second image data (e.g., second stereo image data, second monocular image data, or a left image of a stereo image). For example, the second imaging device 12 may be mounted on the transferring vehicle 91 facing the receiving vehicle 79 (e.g., in FIG. 4A) or the receiving vehicle 79 facing the container 85 (FIG. 5A). In one embodiment, the second imaging device 12 has a second field of view (177,377,477) of the storage portion of the receiving vehicle, where the first field of view (77, 277) overlaps at least partially with the second field of view (177, 377, 477).

In an alternate embodiment, the second imaging device 12 comprises a monocular imaging device that provides a second image section (e.g., right image) of stereo image data of a scene or an object, where the image processing module 18 supports the creation of a stereo image from a combination of the first image section (of the first monocular imaging device) and the second image section with reference to the relative position and orientation of the first imaging device 10 and the second imaging device 12.

In step S975, the mode controller 225 or the system (11, 111, or 311) determines whether or not the operational status of the first imaging device 10 is acceptable. If the mode controller 225 or system determines that the operational status of the first imaging device 10 is acceptable, the method continues with step S976. For example, acceptable operational status may mean one or more of the following: (1) the first imaging device 10 is functioning properly, (2) first image data produced by the first imaging device 10 meets one or more quality criteria (e.g., rectification, stereo correspondence, pixel attributes), or (3) the first image data 10 is a reliable representation of the field of view during a sampling period of interest. However, if the mode controller 10 or system determines that the operational status of the first imaging device 10 is not acceptable, the method continues with step S978.

In step S976, the mode controller 225 or the system (11, 111 or 311) determines whether or not the operational status of the second imaging device 12 is acceptable. If the mode controller 225 or system determines that the operational status of the second imaging device 12 is acceptable, the method continues with step S976. For example, acceptable operational status may mean one or more of the following: (1) the second imaging device 12 is functioning properly, (2) second image data produced by the second imaging device 12 meets one or more quality criteria (e.g., rectification, stereo correspondence, pixel attributes), or (3) the second image data 10 is a reliable representation of the field of view during a sampling period of interest. However, if the mode controller 225 or system determines that the operational status of the second imaging device 12 is not acceptable, the method continues with step S978.

In step S977, the mode controller 225 or the system (11, 111 or 311) determines whether or not the operational status of the image processing module 18 is acceptable. Step S977 may be carried out with various techniques, which may be applied separately or cumulatively. Under a first technique, if the image processing module 18 can detect edges of one or more objects in the first image data, such as the edges of the spout 89, the edges of the spout end 87, or the edges storage portion 93 of the container during a sampling time period, the mode controller 225 or the system may regard the operational status of the imaging processing module 18 acceptable during the sampling time period. Under a second technique, if the image processing module 18 can identify the spout end 87 and the spout coordinates in the image data, and if the image processing module 18 can identify a perimeter of the opening in the storage portion, and the perimeter coordinates in the image data during a sampling time period, the mode controller 225 or the system may regard the operational status of the image processing module as acceptable during the sampling time period. The spout coordinates may be expressed in coordinates relative to the first imaging device 10, the second imaging device 12, or both, and may be transformed to real-world coordinates or coordinates with reference to a reference point on the transferring vehicle, for example.

If the mode controller 225 or system determines that the operational status of the image processing module 18 is acceptable, the method continues with step S979. However, if the mode controller 225 or system determines that the operational status of the image processing module 18 is not acceptable, the method continues with step S980.

In step S979, the mode controller 225 or the system (11, 111 or 311) authorizes the system to operate in an automated control mode, where the image processing module 18 processes image data to facilitate determination of the relative position (or spatial orientation) of the spout end 87 and the storage portion 93 of the receiving vehicle. The automated control mode is supported by steps S906 and S908, for example.

In step S906, an image processing module 18 or a container module 20 identifies a container perimeter 81 of the storage portion 93 in the collected image data (e.g., the first image data, the second image data or both), where the storage portion 93 has an opening 83 inward from the container perimeter 81 for receipt of the agricultural material. Step S906 may be carried out in accordance with various techniques, which may be applied alternately or cumulatively. Under a first technique, the image processing module 18 or container module 20 may employ the following processes or sub-steps: (1) measuring a strength of one or more edges 181 in the image data (raw and rectified image data); (2) identifying an angle and offset of candidate linear segments in the image data with respect to an optical axis, reference axis (e.g., direction of travel of the transferring vehicle), or reference point indexed to one or more imaging devices (10, 12); and (3) using spatial and angular constraints to eliminate identified candidate linear segments that cannot logically or possibly form part of the identified linear segments of the container perimeter, where the localizer 111 transforms the identified linear segments into three dimensional coordinates relative to a reference point or reference frame of the receiving vehicle and/or the harvesting vehicle.

Under a second technique, the image processing module 18 or container module 20 may receive container reference data, or measurements of dimensions of the container perimeter 81 or the storage portion 93 of the vehicle, to facilitate identification of candidate linear segments, or candidate data points, that qualify as identified linear segments of the container perimeter 81.

Under the third technique, the image processing module 18 or container module 20 may receive an estimated angle 97 of the storage portion 93 relative to the propelling portion 75 of the vehicle to facilitate identification of candidate linear segments that qualify as identified linear segments of the container perimeter 81.

Under a fourth technique, the image processing module 18 or container identification module 20 provides the received estimated angle 97 of the storage portion 93 relative to the propelling portion 75 of the vehicle.

In step S908, the image processing module 18 or a spout module 22 identifies a spout 89 (or spout end 87) of the transferring vehicle (e.g., harvesting vehicle) in the collected image data. The image processing module 18 or the spout module 22 may use various techniques, which may be applied alternately or cumulatively. Under a first technique, the image processing module 18 or the spout module 22 identifies candidate pixels in the image data (e.g., rectified or raw image data) based on expected color and expected texture features of the image data, where the candidate pixels represent a portion of the spout 89 (e.g., combine auger spout) or spout end 87.

Under a second technique, the image processing module 18 or the spout module 22 estimates a relative position, or relative angle, of the spout 89 or the spout end 87, to the imaging device based on the classified, identified candidate pixels of a portion of the spout 89.

Under a third technique, the image processing module 18 or the spout module 22 receives an estimated combine spout position, or spout angle, relative to the mounting location, optical axis, reference axis, or reference point of the imaging device (10, 12) based on previous measurements to provide constraint data on where the spout 56 can be located possibly.

Under a fourth technique, the image processing module 18 or spout module 22 provides the estimated combine spout position, or estimated spout angle, to the spout localizer 125.

In step S980, the mode controller 225 or the system (11, 111, or 311) authorizes the system to operate in a manual control mode or a semi-automated control mode to facilitate determination or control of the relative position of the spout 87 and the storage portion 93 of the receiving vehicle. The manual control mode means that a human operator of the transferring vehicle or receiving vehicle controls the steering system 30, the braking system 34, and the propulsion system 38 via a user interface 44 (e.g., switches, levers, steering wheel, or floor pedals in a cab of the transferring vehicle or the receiving vehicle).

The semi-automated control mode means that the first location-determining receiver 42 provides first motion data for controlling the transferring vehicle in accordance with a target path plan (e.g., target linear path or target curved path). Similarly, the semi-automated control mode means that the second location determining receiver 142 provides second motion data for controlling the receiving vehicle in accordance with the target path plan such that the receiving vehicle follows or tracks the path (e.g., along a parallel path) of the transferring vehicle with a desired target offset. However, the semi-automated control mode may require a human operator in the transferring vehicle, the receiving vehicle or both to adjust (e.g., fine tune) the relative position of the vehicles (e.g., to deviate from the planned target path provided by following the first motion data, the second motion data, or both of the location determining receivers (42, 142)) to properly align the spout end 87 and the storage portion 93 for transferring material from the transferring vehicle to the receiving vehicle.

In one configuration, the mode controller 225 is adapted to authorize operation in the semi-automated control mode if the first and second operational statuses are acceptable. The semi-automated control mode comprises an operational mode where a master controller 59 coordinates the movement of the vehicles from motion data provided by the first location-determining receiver 42 and the second location-determining receiver 142 to place the vehicles in general alignment along substantially parallel paths such that an operator of the transferring vehicle can manually adjust or fine tune the relative position and velocity of the transferring vehicle to the receiving vehicle or the relative position of the spout 89 with respect to the receiving vehicle for transferring of material into the storage portion 93, where the semi-automated mode does not use image data of the image processing module 18 for any alignment of the spout 89 or the vehicles.

Step S981 follows step S979. In step S981, the master controller 59, the slave controller 159, or the system generates command data for one or more of the following: the transferring vehicle, the receiving vehicle, and the rotation actuator (210 or 260), the tilt actuator 262, and the deflector actuator 264. In one embodiment, the command data may comprise one or more of the following: steering command data for the receiving vehicle, steering command data for the transferring vehicle, or actuator command data for rotating a spout end of a spout of the transferring vehicle.

In step S914, in a first configuration, the controller (59 or 159) or the steering controller 32 steers the receiving vehicle in accordance with the cooperative alignment. In a second configuration, the vehicle controller or the steering controller 32 may steer the transferring vehicle in accordance with the cooperative alignment. In a third configuration, the vehicle controller (59 or 159) or steering controllers 32 of both the transferring vehicle 91 and the receiving vehicle 79 steer both vehicles in accordance with the cooperative alignment, or maintenance of a target spatial offset suitable for unloading or transfer of the material between the vehicles. In a fourth configuration, the actuator 116 (e.g., a servo-motor, electric motor, linear motor and linear-to-rotational gear assembly, or electro-hydraulic device) controls the spout angle of the spout 89, or the spout end 87, with respect to the direct of travel or another reference axis of the transferring vehicle in response to alignment module 24 or the image processing module 18 (e.g., smart unloading controller).

Figure 10:
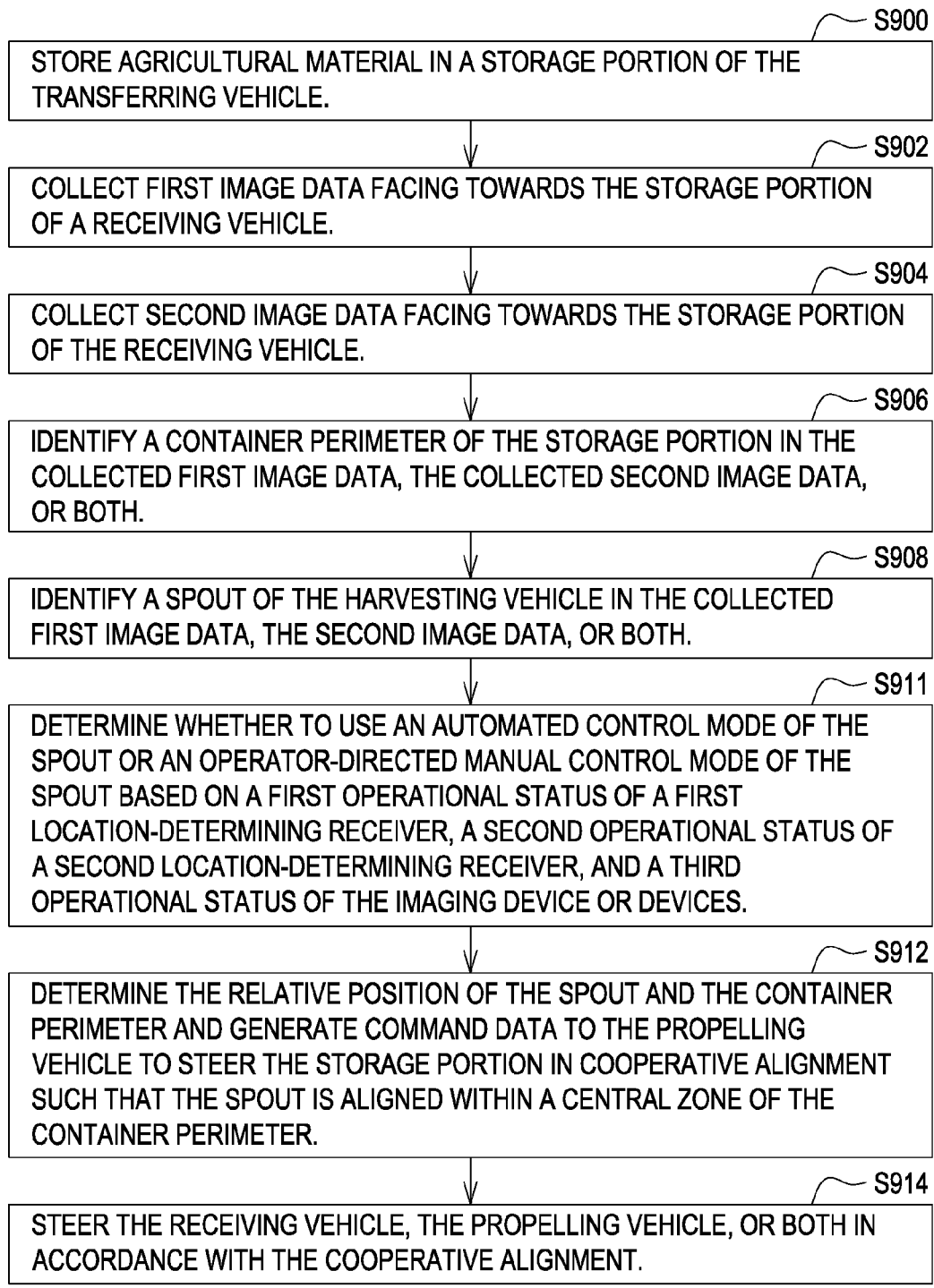
FIG. 10 is a flow chart of another method for a machine vision-augmented guidance system for facilitating the unloading of agricultural material from a vehicle (e.g., combine).

FIG. 10 is a flow chart of a method for facilitating the unloading of agricultural material from a vehicle or between a transferring vehicle (91) and a receiving vehicle (79). The method of FIG. 9 begins in step S900 and may use one or more of the following embodiments of the systems (11, 111, or 311) previously disclosed herein.

The method of FIG. 10 is similar to the method of FIG. 9, except the method of FIG. 10 replaces step S910 with step S911. Like reference numbers in FIG. 9 and FIG. 10 indicate like elements.

In step S911, the mode controller 225 or image processing module 18 determines whether to use an automated control mode of the spout or an operator-directed manual control mode of the spout 89 based on the acceptability or reliability of a first operational status of a first location-determining receiver 42, a second operational status of a second location-determining receiver 142, and a third operational status of the imaging device or devices (10, 12).

In one illustrative example, the first operational status is acceptable if the first location determining receiver 42 provides reliable position data that meets or exceeds a dilution of precision threshold or another navigation satellite reliability measure during a sampling period; the second operational status is acceptable if the second location determining receiver 142 provides reliable position data that meets or exceeds a dilution of precision threshold or another navigation satellite reliability measure (e.g., total equivalent user range error) during a sampling period; and the third operational status is acceptable if the first imaging device 10 provides reliable image data in which the container module 20 or spout module 22 (e.g., or the respective edge detection modules therein) are capable of any of the following: (1) reliably identifying or resolving one or more edges of spout or container perimeter 81 in the collected image data during a sampling time period, or (2) reliably identifying on a time percentage basis (e.g., at least 99.99% of the time) one or more reference objects (e.g., a reference pattern or reference image on the spout or receiving vehicle) or objects in the image data.

Step S911 may be executed in accordance with one or more procedures that may be applied separately or cumulatively. Under a first procedure, if the first, second and third operational statuses are not acceptable or reliable, the system (11, 111, 311) or mode controller 225 reverts to manual mode control for control of the spout 89 and container 85 alignment and the spatial alignment of the transferring vehicle 91 and the receiving vehicle 79 during unloading of agricultural material from the transferring vehicle 91 to the receiving vehicle 79.

Under a second procedure, if the first operational status, the second operational status and the third operational status are acceptable or indicative of properly functioning, the system (11, 111, 311) is capable of operating in an automated mode (e.g., fully automated mode) and the mode controller 225 permits the use of the first location determining receiver 42, the second location determining receiver 142 and the imaging device 10 for one or more of the following: (1) to track or align relative position of the receiving vehicle 79 and the transferring vehicle 91 for control of the spout 89 and container 85 spatial alignment during unloading, and (2) to track or align the spatial alignment of the transferring vehicle 91 and the receiving vehicle 79 during unloading of agricultural material from the transferring vehicle 91 to the receiving vehicle 79.

Under a third procedure, if the first operational status, the second operational status and the third operational status are acceptable or indicative of properly functioning, the system (11, 111, 311) or mode controller 225 is capable of operating in an automated mode (e.g., fully automated mode) and determines if there is a storage portion 93 or container 85 (e.g., cart) properly positioned beneath the spout end 87 of the spout 89 so that no material (e.g., grain) will be spilled when the material begins to flow from the spout end 87 to the receiving vehicle. In the automated control mode, if a storage portion 93 is detected and properly positioned with respect to the transferring vehicle 91 and the spout 89, the system (11, 111, 311), imaging module 18 or vehicle controller 46 commands the combine to turn on the unloading auger or auger drive 47.

Under a fourth procedure, if the first operational status and the second operation status are acceptable and if the third operational status is unacceptable, the mode controller 225 permits the use of the first location determining receiver 42 and the second location determining receiver 142 to track or align the relative position of the receiving vehicle 79 and the transferring vehicle 91 during unloading. However, the mode controller 225 may prohibit use of the imaging device (10,12) to track or align the relative align relative position of the receiving vehicle 79 and the transferring vehicle 91 for control of the spout 89 and container 85 spatial alignment during unloading. Accordingly, where operating under the fourth procedure, the mode may be referred to as partially automated or partially manual mode because automated aspect is limited to the first location determining receiver 42 and the second location determining receiver 142 to track or align the relative position of the receiving vehicle 79 and the transferring vehicle 91 during unloading, subject to manual adjustment of the operator of the transferring vehicle 91 within certain tolerance to align manually the spout 89 and the container 85 of the receiving vehicle 79 for unloading. The tolerance is limited to a spatial separation to prevent or minimize the risk of collision between the transferring vehicle 91 and the receiving vehicle 79 based on the respective dimensions, wheel base, turning radius, speeds, velocities and headings of the transferring vehicle 91 and the receiving vehicle 79. Under the fourth procedure, the first wireless communications device 48 can wirelessly transmit the first location and first motion data from the first location determining 42 receiver to the second wireless communications device 148. At the receiving vehicle, the controller or slave controller (159) may determine a position difference between the first location and second location data of the second-location determining receiver 142; the controller or slave controller (159) may determine a motion difference between the first motion data and second motion data (e.g., velocity, acceleration, heading or yaw error) to facilitate leader-follower tracking along generally parallel paths of the vehicles with a target spatial separation. In some cases, first location data and first motion data are wirelessly transmitted from the transferring vehicle to the receiving vehicle to determine the relative position, where operational mode status data optionally may be wirelessly transmitted prior to, during, or after the transmission of the first location data and first motion data.

Under the fifth procedure, the mode controller 225 permits (e.g., temporarily permits) the image processing system (11, 111, 311), the mode controller 225 and the steering controller 32 to use collected image data from the first imaging device 10, odometry data from the odometry sensor 440, and inertial data from the inertial sensor 442 if the first operational status and the second operational status are unacceptable and if the third operational status is acceptable. Accordingly, under the fifth procedure the mode controller 225 authorizes the system (11, 111, 311) to operate in an automated mode (for a limited time period measured from a last available position data from one or more location determining receivers) or a partially automated mode in which the user can override or adjust the spatial separation between the transferring vehicle 91 and the receiving vehicle 79 or the spatial alignment between the spout 89 and the container 85 of the receiving vehicle 79. For example, the steering controller 32 operates the system (11, 111, 311) in a partially automated mode in which an operator supervises the steering system 30 of the transferring vehicle 91 and the receiving vehicle 79; where the operator can override the automated steering control of the steering controller 32 by the master controller 59 based on the odometry data and inertial data; after the limited time period expires, the mode controller 225 only authorizes operation in the manual mode, unless the first operational status and the second operational status become acceptable or reliable prior to expiration of the limited time period.

Under a sixth procedure, the storage portion 93 of the receiving vehicle 79 begins to become full, the system (11, 111, 311), propulsion controller 40, braking controller 36, vehicle controller 46, and auger rotation system 16 may use the profile of the surface the agricultural material to execute the operator-selected fill strategy (e.g., back-to-front, front-to-back, or another fill strategy).

To execute the fill strategy in the automated control mode, the system (11, 111, 311) can unload the agricultural material into particular areas of the container 85 that contain less agricultural material to promote even filling and distribution of agricultural material in the container 85. In the automated control mode, the system (11, 111, 311) can adjust the unloading alignment between the transferring vehicle 91 and the receiving vehicle 79 by one or more of the following procedures: (1) command the spout 89 to rotate or change its spout angle with respect to the transferring vehicle 91 or a vertical plane associated with the transferring vehicle 91 that intercepts at least one rotational axis of the spout 89; (2) command the unloading auger or auger drive 47 to rotate to move agricultural material from the storage in the transferring vehicle to the storage portion 93 of the receiving vehicle; (3) command changes to ground speed, velocity, acceleration or heading of the transferring vehicle 91, the receiving vehicle 79, or both; (4) command the operator of the vehicle or vehicles (79, 91) to manually adjust ground speed, velocity, acceleration or heading of the transferring vehicle 91, the receiving vehicle 79, or both, or (5) command one or more controllers (32, 36, 38) to command the transferring vehicle 91, the receiving vehicle 79 or both to change its or their relative position. When the entire container 85 or storage portion 93 is filled to capacity or the level selected by the operator, the vehicle controller 46 or auger rotation system 16 turns off the unloading auger or the auger drive 47.

Under a seventh procedure in a manual control mode, the operator interacts with the user interface 44 of the system (11, 111, 311) to adjust the unloading alignment between the transferring vehicle and the receiving vehicle by any of the following: (1) the operator's changing ground speed, velocity, acceleration or heading of the transferring vehicle 91, the receiving vehicle 79, or both, or (2) the operator can adjust manually the spout angle based on imaged displayed to an operator on the user interface 44 from an imaging device (10, 12). Further, in the manual control mode, the operator may turn or off the unloading auger or auger drive.

The method and system is well suited for enhancing the efficiency of unloading of a transferring vehicle (e.g., combine) to a receiving vehicle (e.g., tractor pulling a grain cart) by facilitating the velocity or speed matching of the vehicles via position data from location determining receivers, where fine tuning of the alignment of the spout end and the container perimeter is supported by image data from one or more imaging devices. In the absence of the method and system disclosed herein, the operator of the receiving vehicle tends to set a constant speed that is below the optimal speed for harvesting to avoid spilling agricultural material on the ground and missing the container of the receiving vehicle. Accordingly, the method and system is well suited for reducing the time to harvest a field and to collect the grain than otherwise possible.

Having described the preferred embodiment, it will become apparent that various modifications can be made without departing from the scope of the invention as defined in the accompanying claims.

The following is claimed:

1. A system for facilitating the transfer of agricultural material from a transferring vehicle to a receiving vehicle, the system comprising:
   a receiving vehicle comprising a propelled portion for propelling the receiving vehicle and a storage portion for storing agricultural material;
   a transferring vehicle having a spout for directing agricultural material toward the storage portion of the receiving vehicle;
   a first location-determining receiver on or associated with the transferring vehicle;
   a second location-determining receiver on or associated with the receiving vehicle;
   a first imaging device facing towards the storage portion of the receiving vehicle, the first imaging device collecting first image data;
   a mode controller for determining whether to use an automated control mode of the spout position with respect to the storage portion or an operator-directed manual control mode of the spout based on a first operational status of the first location-determining receiver, a second operational status of the second location-determining receiver, and a third operational status of the first imaging device, an image processing module, or both; and
   the mode controller adapted to authorize operation in the automated control mode if the first, second and third operational statuses are acceptable, the automated control mode comprising an operational mode where an image processing module processes the collected image data to facilitate determination of the relative position of the spout and the storage portion and where the image processing module generates command data to place the storage portion and spout in relative cooperative alignment such that the spout is aligned for transferring of material into storage portion.

2. The system according to claim 1 wherein the command data may comprise one or more of the following: steering command data for the receiving vehicle, steering command data for the transferring vehicle, or actuator command data for rotating a spout end of a spout of the transferring vehicle.

3. The system according to claim 1 wherein the first operational status is acceptable if the first location determining receiver provides reliable position data that meets or exceeds a dilution of precision threshold during a sampling period, wherein the second operational status is acceptable if the second location determining receiver provides reliable position data that meets or exceeds a dilution of precision threshold during a sampling period, and wherein the third operational status is acceptable if the first imaging device provides reliable image data in which the image processing module is capable of reliably identifying one or more edges of the spout, a container perimeter of the storage portion, or both in the collected image data during a sampling time period.

4. The system according to claim 1 wherein the first operational status is acceptable if the first location-determining receiver provides reliable position data that meets or exceeds a dilution of precision threshold during a sampling period, wherein the second operational status is acceptable if the second location-determining receiver provides reliable position data that meets or exceeds a dilution of precision threshold during a sampling period, and wherein the third operational status is acceptable if the image processing module is capable of reliably identifying one or more edges of a spout end of the spout and one or more edges of the container perimeter of the storage portion.

5. The system according to claim 4 wherein the first location-determining receiver provides a first indicator message that indicates that the first location-determining receiver meets or exceeds a precision dilution threshold, wherein the second location-determining receiver provides a second indicator message that indicates that the second location-determining receiving exceeds a precision dilution threshold, and wherein the image processing module provides a third indicator message that indicates that the image processing module is capable of reliably identifying one or more edges of the spout end and one or more edges of the container perimeter of the storage portion during a sampling period.

6. The system according to claim 1 wherein the mode controller is adapted to authorize operation in a semi-automated control mode if the first and second operational statuses are acceptable, the semi-automated control mode comprising an operational mode where a master controller coordinates the movement of the vehicles from motion data provided by the first location-determining receiver and the second location-determining receiver to place the vehicles in general alignment along substantially parallel paths such that an operator of the transferring vehicle can manually adjust or fine tune the relative position and velocity of the transferring vehicle to the receiving vehicle or the relative position of the spout with respect to the receiving vehicle for transferring of material into the storage portion, where the semi-automated mode does not use image data of the image processing module for any alignment of the spout or the vehicles.

7. The system according to claim 1 further comprising:
   a steering controller associated with a steering system of the propelled portion for steering the receiving vehicle in accordance with the cooperative alignment based on location data and motion data from the first location-determining receiver and the second location-determining receiver in the automated control mode.

8. The system according to claim 1 further comprising:
a steering controller associated with a steering system of the transferring vehicle for steering the transferring vehicle in accordance with the cooperative alignment based on location data and motion data from the first location-determining receiver and the second location determining receiver in the automated control mode.

9. The system according to claim 1 further comprising:
an actuator for actuating or rotating the spout with respect to the transferring vehicle to place the spout and storage portion in cooperative alignment based on the collected image data.

10. The system according to claim 1 wherein if the first, second and third operational statuses are not acceptable, the system reverts to manual mode control for control of the spout and storage-portion alignment.

11. The system according to claim 1 wherein the first imaging device is mounted on the receiving vehicle.

12. The system according to claim 1 wherein the first imaging device is mounted on the transferring vehicle.

13. The system according to claim 1 wherein the mode controller uses the first location-determining receiver, the second location-determining receiver and the imaging device to track relative position of the receiving vehicle and the transferring vehicle if the first operational status, the second operational status and the third operational status are acceptable or indicative of properly functioning.

14. The system according to claim 1 further comprising:
a first wireless communications device on the transferring vehicle;
a second wireless communications device on the receiving vehicle;
the mode controller using the first location-determining receiver and the second location-determining receiver to track relative position of the receiving vehicle and the transferring vehicle if the first operational status and the second operation status are acceptable and if the third operational status is unacceptable; wherein the first wireless communications device wirelessly transmits first location data and first motion data from the first location determining receiver to the second wireless communications device.

15. The system according to claim 1 further comprising:
an odometer for providing odometry data;
an inertial sensor for providing inertial data, wherein the mode controller uses the image data, odometry data and inertial data if the first operational status and the second operational status are unacceptable and if the third operational status is acceptable.

16. The system according to claim 15 wherein the steering controller operates in a partially automated mode in which an operator supervises the steering of the transferring vehicle and the receiving vehicle; where the operator can override the steering control based on the odometry and inertial data.

17. A method for facilitating the transfer of agricultural material from a transferring vehicle to a receiving vehicle, the transferring vehicle having a spout for transferring the agricultural material to the receiving vehicle, the method comprising:
collecting first image data by a first imaging device facing towards a storage portion of the receiving vehicle;
determining whether to use an automated control mode of the spout or an operator-directed manual control mode of the spout based on a first operational status of a first location determining receiver associated with the transferring vehicle, a second operational status of a second location determining receiver associated with the receiving vehicle, and a third operational status of the first imaging device; and
in the automated control mode, determining the relative position of the spout and the storage portion; and
generating command data to place the spout and storage portion in relative cooperative alignment in the automated control mode such that the spout is aligned with the storage portion if the first, second and third operational statuses are acceptable.

18. The system according to claim 17 wherein the first operational status is acceptable if the first location determining receiver provides reliable position data that meets or exceeds a dilution of precision threshold during a sampling period, wherein the second operational status is acceptable if the second location determining receiver provides reliable position data that meets or exceeds a dilution of precision threshold during a sampling period, and wherein the third operational status is acceptable if the first imaging device provides reliable image data in which the container module or spout module are capable of reliably identifying one or more edges of the spout or a container perimeter of the storage portion in the collected image data during a sampling time period.

19. The method according to claim 17 further comprising:
steering the receiving vehicle, by a steering controller, in accordance with the cooperative alignment based on location data and motion data from the first location determining receiver and the second location determining receiver in the automated control mode.

20. The method according to claim 17 further comprising:
a steering the transferring vehicle, by a steering controller, in accordance with the cooperative alignment based on location data and motion data from the first location determining receiver and the second location determining receiver in the automated control mode.

21. The system according to claim 17 further comprising:
actuating or rotating the spout with respect to the transferring vehicle to place the spout and storage portion in cooperative alignment.

22. The method according to claim 17 wherein if the first, second and third operational statuses are not acceptable, the method reverts to the manual mode control for control of the spout and storage-portion alignment.

23. The method according to claim 17 wherein the first imaging device is mounted on the receiving vehicle.

24. The method according to claim 18 further comprising:
tracking, by the first location determining receiver, the second location determining receiver and the imaging device, relative position of the receiving vehicle and the transferring vehicle if the first operational status, the second operational status and the third operational status are acceptable or indicative of proper functionality.

25. The method according to claim 17 further comprising:
tracking, by the first location determining receiver and the second location determining receiver, relative position of the receiving vehicle and the transferring vehicle if the first operational status and the second operation status are acceptable and if the third operational status is unacceptable, wherein first location and first motion data is wirelessly transmitted from the transferring vehicle to the receiving vehicle to determine the relative position.

26. The method according to claim 17 further comprising:
estimating, via first image data, odometry data and inertial data, the relative position of the receiving vehicle and the transferring vehicle if the first operational status and the second operational status are unacceptable and if the third operational status is acceptable.

27. The method according to claim 26 further comprising: operating the transferring vehicle and the receiving vehicle in a partially automated mode in which an operator supervises the steering of the transferring vehicle and the receiving vehicle; where the operator can override the steering control based on the odometry and inertial data.

* * * * *